United States Patent [19]
Star et al.

[11] Patent Number: 6,007,971
[45] Date of Patent: Dec. 28, 1999

[54] APPARATUS, SYSTEM, AND METHOD FOR PROCESSING PHOTOTHERMOGRAPHIC ELEMENTS

[75] Inventors: Paul C. Star, Blaine; John A. Svendsen, Marine on the St. Croix; Alfredo G. Viglienzoni, Woodbury; John J. Allen, Mendota Heights; Michael P. Juaire, Maple Grove; Anderson L. Griffin, St. Paul; John O. Kirkwold, Champlin; Steven W. Sorensen, Maplewood; Ralph E. Peterson, Maple Grove, all of Minn.

[73] Assignee: Minnesota Mining and Manufacturing, St. Paul, Minn.

[21] Appl. No.: 08/946,945

[22] Filed: Oct. 9, 1997

Related U.S. Application Data

[63] Continuation of application No. 08/239,709, May 9, 1994, abandoned, which is a continuation-in-part of application No. 07/942,633, Sep. 9, 1992, abandoned.

[51] Int. Cl.$^6$ ................................. G03C 5/16; F27B 9/06
[52] U.S. Cl. ..................... 430/350; 219/216; 219/388; 219/469; 219/470; 219/471
[58] Field of Search ................... 219/469, 470, 219/216, 388, 471; 430/350

[56] References Cited

U.S. PATENT DOCUMENTS

| | | |
|---|---|---|
| 3,012,141 | 12/1961 | Thomiszer . |
| 3,242,316 | 3/1966 | Craskens . |
| 3,243,579 | 3/1966 | Sussin . |
| 3,439,905 | 4/1969 | Noble . |
| 3,629,549 | 12/1971 | Svensen . |
| 3,709,472 | 1/1973 | Kreitz et al. . |
| 3,716,018 | 2/1973 | Ohta et al. . |
| 3,739,143 | 6/1973 | Amundson et al. . |
| 3,781,902 | 12/1973 | Shim et al. . |
| 3,797,127 | 3/1974 | Yamada et al. . |
| 3,873,810 | 3/1975 | Larson . |
| 3,934,113 | 1/1976 | Bar-on . |
| 4,172,975 | 10/1979 | Noda . |
| 4,304,985 | 12/1981 | Miller . |
| 4,315,682 | 2/1982 | Parzanici . |
| 4,335,951 | 6/1982 | Scribner . |
| 4,360,566 | 11/1982 | Shimuzu et al. . |
| 4,387,980 | 6/1983 | Ueno et al. . |
| 4,518,845 | 5/1985 | Svendsen . |
| 4,819,032 | 4/1989 | Nagumo . |
| 4,825,041 | 4/1989 | Nagumo et al. . |
| 4,883,941 | 11/1989 | Martin et al. . |
| 5,091,281 | 2/1992 | Nakamura et al. . |
| 5,132,726 | 7/1992 | Yokota et al. . |
| 5,151,576 | 9/1992 | Zaoralek . |
| 5,241,159 | 8/1993 | Chatteriee et al. . |
| 5,352,863 | 10/1994 | Svendsen . |

FOREIGN PATENT DOCUMENTS

| | | |
|---|---|---|
| A 0 262 833 | 4/1988 | European Pat. Off. . |
| 0 500 047 A3 | 2/1992 | European Pat. Off. . |
| 0 546 190 A1 | 6/1992 | European Pat. Off. . |
| 765 175 | 6/1934 | France . |
| A 765 175 | 6/1934 | France . |
| A 1 338 102 | 10/1962 | France . |
| 1 338 102 | 8/1963 | France . |
| 1338102 | 8/1963 | France . |
| A 20 49 293 | 5/1971 | Germany . |
| 59-083182 | 5/1984 | Japan . |

OTHER PUBLICATIONS

Harris Corporation Brochure: PhotoPro™ 2000 (fold–out).
Harris Corporation Technical Brief: Laser Image Recorder Model 2000 (single sheet).
Harris Corporation Preliminary Technical Brief: Model 2500 (single sheet).
Lasertechnics, Imaging Products Division, 300D Continuous Tone Printer, 4 sheets.

*Primary Examiner*—Thorl Chea
*Attorney, Agent, or Firm*—William D. Bauer; William K. Weimer

[57] ABSTRACT

An apparatus, system, and method for processing photothermographic elements. The apparatus thermally develops a photothermographic element by heating the photothermographic element between a heated member, having a resilient layer, and a plurality of rollers. The apparatus can be a component of other apparatus and systems including those having the ability to expose the photothermographic element to form a latent image.

43 Claims, 12 Drawing Sheets

APPARATUS, SYSTEM, AND METHOD FOR PROCESSING PHOTOTHERMOGRAPHIC ELEMENTS

This is a continuation of application Ser. No. 08/239,709 filed May 9, 1994, now abandoned, which is a continuation-in-part of application Ser. No. 07/942,633 filed Sep. 9, 1992, now abandoned.

FIELD OF THE INVENTION

The invention relates to apparatus, methods, and systems for processing photothermographic elements and, more particularly, to apparatus, methods, and systems for exposing, developing, and cooling photothermographic elements.

BACKGROUND OF THE INVENTION

Photothermography is an established imaging technology. In photothermography, a photothermographic element is processed in two steps. The first step involves exposing the photothermographic element to radiation on an image-wise basis to create a latent image in the photothermographic element. This step is often referred to as imaging. The second step involves heating the photothermographic element to a development temperature for a sufficient period of time to thermally develop the latent image to a visible image. This step is often referred to as developing or, simply, as processing.

Devices and methods for developing are generally known and include contacting the photothermographic element with a heated platen, drum or belt (sometimes referred to as endless belts), blowing heated air onto the photothermographic element, immersing the photothermographic element in a heated inert liquid, and exposing the element to radiant energy of a wavelength to which the element is not photosensitive.

Photothermographic elements developed using these known devices and methods often have an uneven or non-uniform image density, image distortions and/or surface abrasion defects. Non-uniform image density defects occur during the development process due to, for instance, surface variations on the heated member, the presence of foreign matter on the photothermographic element or the heated member, and insufficient allowance for outgassing of volatile materials generated during developing. Image distortions can occur due to uncontrolled dimensional changes in the base of the photothermographic element during heating and/or cooling of the photothermographic element. Surface abrasions or marring occur by dragging the photothermographic element across a stationary component in the heating device. In many applications such as text and line drawings, these defects may be acceptable. However, users of medical, industrial, graphic, and other imaging applications desire uniform and high quality images.

In particular, because many belts can have patterns or seams, the image in the photothermographic elements developed using belts can receive an unacceptable corresponding development pattern or seam mark. While drums can make efficient use of space and can have a surface free of belt patterns and seams, drums require the photothermographic element to follow a curved path which can induce curling. In addition, drums require the photothermographic element to be guided along the curved path which can cause surface marring in the photothermographic element. Furthermore, heating the photothermographic element using many known drum devices or other heating devices can create wrinkles when heating the photothermographic element.

As a result, there is a need for a thermal processor which provides uniform and high quality images. There is also a need to mate such a thermal processor with complementary devices and photothermographic elements to offer apparatus, systems, and methods which together optimize uniformity and image quality.

In addition to uniformity and image quality, there is a need for such a processor and related apparatus, systems, and methods which provide increased throughput rates. The capability to image and develop a variation of format sizes are also desirable features not currently available in high quality photothermography.

Although known photothermographic apparatus, systems, and methods do have environmental advantages over wet development systems, there are still significant issues unaddressed.

SUMMARY OF THE INVENTION

The present invention addresses and overcomes these problems by providing a thermal processor, as well as other apparatuses, systems, and methods using or working in conjunction with the thermal processor.
Summary One embodiment of the invention includes a thermal processor, adapted to thermally develop an image in a photothermographic element. The photothermographic element is transported at a transport rate. The thermal processor includes a moveable heated member positioned to receive the photothermographic element and to heat the photothermographic element to at least a threshold development temperature for a dwell time to develop an image in the photothermographic element. The photothermographic element also includes a plurality of rotatable guiding members positioned at guiding positions adjacent to the heated member for guiding the photothermographic element against the heated member by applying a total biasing force to the photothermographic element of not greater than 200 grams per centimeter of width of the photothermographic element. The heated member is moveable and the guiding members are rotatable at rates which approximately match the transport rate of the photothermographic element.

Another embodiment includes a thermal processor, adapted to thermally develop an image in a photothermographic element at a throughput rate. The thermal processor includes a moveable heated member positioned to receive the photothermographic element to heat the photothermographic element to at least a threshold development temperature. The heated member includes a resilient layer having a thickness and thermal conductivity for contacting the photothermographic element. The resilient layer is sufficiently thick so that a foreign particle can be depressed into the resilient layer to reduce an image defect in the image due to insufficient heat transfer causable by the foreign particle. And, the resilient layer is sufficiently thin and sufficiently thermally conductive so that the resilient layer delivers to the photothermographic element sufficient heat to thermally develop the photothermographic element at the throughput rate. The thermal processor also includes a heater thermally connected to the heated member for heating the heated member.

Another embodiment includes a thermal processor, adapted to thermally develop an image in a photothermographic element at a throughput rate. The photothermographic element is transported at a transport rate. The thermal processor includes a moveable heated member positioned to receive the photothermographic element to heat the photothermographic element to at least a threshold development temperature. The heated member includes a resilient layer having a thickness and thermal conductivity for contacting the photothermographic element. The resilient layer is sufficiently thick so that a foreign particle can be depressed into the resilient layer to reduce an image defect in the image due to insufficient heat transfer causable by the foreign particle. The resilient layer is sufficiently thin and sufficiently thermally conductive so that the resilient layer delivers to the photothermographic element sufficient heat to thermally develop the photothermographic element at the throughput rate. The thermal processor also includes a heater thermally connected to the heated member for heating the heated member. The thermal processor also includes a plurality of rotatable guiding members positioned at guiding positions adjacent to the heated member for guiding the photothermographic element against the heated member by applying a total biasing force to the photothermographic element of not greater than 200 grams per centimeter of width of the photothermographic element. The heated member is moveable and the guiding members are rotatable at rates which approximately match the transport rate of the photothermographic element.

Another embodiment includes a thermal processor, adapted to thermally develop an image in a photothermographic element. The photothermographic element is transported at a transport rate. The thermal processor includes a moveable heated member positioned to receive the photothermographic element to heat the photothermographic element to at least the threshold development temperature for the dwell time. The heated member is moveable when heating the photothermographic element. The thermal processor also includes a heater thermally connected to the heated member for heating the heated member. The thermal processor also includes a plurality of rotatable guiding members positioned at guiding positions adjacent to the heated member for biasing the photothermographic element against the heated member. The guiding members are sufficiently spaced apart to allow the portion of the photothermographic element between the rotatable rollers to expand and contract. The heated member is moveable and the guiding members are rotatable at rates which approximately match the transport rate of the photothermographic element.

Another embodiment includes an apparatus, adapted to be used with a photothermographic element sensitive to radiation, for converting data to an image corresponding to the data on the photothermographic element. The photothermographic element is transported at a transport rate. The apparatus includes an imaging device for converting the data to radiation, and for receiving and exposing the photothermographic element on an image-wise basis to the radiation to create an image in the photothermographic element. The apparatus also includes a thermal processor which includes a moveable heated member positioned to receive the photothermographic element after being exposed by the imaging device and to heat the photothermographic element to at least a threshold development temperature to thermally develop the image in the photothermographic element. The thermal processor also includes a heater thermally connected to the heated member for heating the heated member. The thermal processor also includes a plurality of rotatable guiding members positioned at guiding positions adjacent to the heated member for biasing the photothermographic element against the heated member. The guiding members are sufficiently spaced apart to allow the portion of the photothermographic element between the rotatable rollers to expand and contract. The heated member is moveable and the guiding members are rotatable at rates which approximately match the transport rate of the photothermographic element.

Another embodiment includes an apparatus, adapted to be used with a photothermographic element sensitive to radiation, for converting data to an image corresponding to the data on the photothermographic element. The photothermographic element is transported at a transport rate. The apparatus includes an imaging device for converting the data to radiation, and for receiving and exposing the photothermographic element on an image-wise basis to the radiation to create an image in the photothermographic element. The apparatus also includes a thermal processor which includes a moveable heated member positioned to receive the photothermographic element after being exposed by the imaging device and to heat the photothermographic element to at least a threshold development temperature for a dwell time to thermally develop the image in the photothermographic element. The thermal processor also includes a heater thermally connected to the heated member for heating the heated member. The thermal processor also includes a plurality of rotatable guiding members positioned at guiding positions adjacent to the heated member for guiding the photothermographic element against the heated member by applying a total biasing force to the photothermographic element of not greater than 200 grams per centimeter of width of the photothermographic element. The heated member is moveable and the guiding members are rotatable at rates which approximately match the transport rate of the photothermographic element.

Another embodiment includes an apparatus, adapted to be used with a photothermographic element sensitive to radiation, for converting data to an image corresponding to the data on the photothermographic element. The apparatus includes an imaging device for converting the data to radiation, and for exposing the photothermographic element on an image-wise basis to the radiation to create an image in the photothermographic element. The apparatus also includes a thermal processor, which includes a moveable heated member positioned to receive the photothermographic element after being exposed by the imaging device and to heat the photothermographic element to at least a threshold development temperature at a throughput rate. The heated member includes a resilient layer having a thickness and thermal conductivity for contacting the photothermographic element. The resilient layer is sufficiently thick so that a foreign particle can be depressed into the resilient layer to reduce an image defect in the image due to insufficient heat transfer causable by the foreign particle. And, the resilient layer is sufficiently thin and sufficiently thermally conductive so that the resilient layer delivers to the photothermographic element sufficient heat to thermally develop the photothermographic element at the throughput rate. The thermal processor also includes a heater thermally connected to the heated member for heating the heated member.

Another embodiment includes an apparatus, adapted to be used with a photothermographic element sensitive to radiation, for converting data to an image corresponding to the data on the photothermographic element. The photothermographic element is transported at a transport rate. The apparatus includes an imaging device for converting the data to radiation, and for receiving and exposing the photothermographic element on an image-wise basis to the radiation to create an image in the photothermographic element. The apparatus includes a thermal processor, which includes a moveable heated member positioned to receive the photothermographic element after being exposed by the imaging device and to heat the photothermographic element to at least a threshold development temperature for a dwell time to develop the image in the photothermographic element.

The apparatus also includes a heater thermally connected to the heated member for heating the heated member. The apparatus also includes a plurality of rotatable guiding members positioned at guiding positions adjacent to the heated member for biasing the photothermographic element against the heated member. The guiding members are sufficiently spaced apart to allow the portion of the photothermographic element between the rotatable rollers to expand and contract. The thermal processor also includes cooling means positioned to received the photothermographic element from the heated member for cooling the photothermographic element. The heated member is moveable and the guiding members are rotatable at rates which approximately match the transport rate of the photothermographic element.

Another embodiment includes an apparatus, adapted to be used with photothermographic element sensitive to radiation, for converting data to a visible image corresponding to the data on the photothermographic element. The apparatus includes an imaging device for converting the data to modulated radiation, and for exposing the photothermographic element on an image-wise basis to the modulated radiation to apply a selected number of photons per unit area per unit time to create a latent image on the photothermographic element. The imaging device creates a exposure variation of not more than two percent. The apparatus also includes a thermal processor positioned to receive the photothermographic element after being exposed by the imaging device, for heating the photothermographic element to a development temperature which varies over the photothermographic element not more than two degrees Fahrenheit developing the latent image into the visible image. The visible image created on the photothermographic element varies due to the apparatus by not more than 0.20 optical density at a specific optical density within a range of 0.50 to 3.0 optical density.

Another embodiment includes an apparatus, adapted to be used with a photothermographic element sensitive to radiation, for converting data to an image corresponding to the data on the photothermographic element. The apparatus includes an enclosure having a first chamber, a second chamber, and a passage through which the second chamber communicates with the first chamber and through which the photothermographic element is transportable. The first chamber has a positive air pressure relative to the second chamber. The apparatus also includes an imaging device positioned within the first chamber for converting the data to radiation and exposing the photothermographic element on an image-wise basis to the radiation to create an image in the photothermographic element. The apparatus includes a thermal processor positioned within the second chamber for receiving the photothermographic element after being exposed by the imaging device through the passage, and for heating the photothermographic element to develop the image in the photothermographic element.

Another embodiment includes an apparatus, adapted to thermally develop an image in a photothermographic element. The apparatus includes a moveable heated member positioned to receive the photothermographic element and to heat the photothermographic element. The apparatus also includes a plurality of rotatable guiding members positionable relative to the heated member between a closed position in which the guiding members can guide the photothermographic element against the heated member and an open position in which the guiding members provide greater access to the heated member.

Another embodiment includes a system, adapted for converting data to an image corresponding to the data. The system includes a photothermographic element transported at a transport rate. The system also includes an imaging device positioned to receive the photothermographic element for converting the data to radiation and for exposing the photothermographic element on an image-wise basis to the radiation to create an image in the photothermographic element. The system also includes a thermal processor, which includes a moveable heated member positioned to receive the photothermographic element after being exposed by the imaging device and to heat the photothermographic element to at least a threshold development temperature for a dwell time to thermally develop the image in the photothermographic element. The thermal processor also includes a heater thermally connected to the heated member for heating the heated member. The thermal processor also includes a plurality of rotatable guiding members positioned at guiding positions adjacent to the heated member for guiding the photothermographic element against a portion of the heated member by applying a total biasing force to the photothermographic element of not greater than 200 grams per centimeter of width of the photothermographic element. The heated member is moveable and the guiding members are rotatable at rates which approximately match the transport rate of the photothermographic element.

Another embodiment includes a system, adapted for converting data to an image corresponding to the data. The system includes a photothermographic element transported at a transport rate. The system also includes an imaging device positioned to receive the photothermographic element for converting the data to radiation and for exposing the photothermographic element on an image-wise basis to the radiation to create an image in the photothermographic element. The system also includes a thermal processor, which includes a moveable heated member positioned to receive the photothermographic element after being exposed by the imaging device and to heat the photothermographic element to at least a threshold development temperature for a dwell time to thermally develop the image in the photothermographic element. The thermal processor also includes a heater thermally connected to the heated member for heating the heated member. The thermal processor also includes a plurality of rotatable guiding members positioned at guiding positions adjacent to the heated member for biasing the photothermographic element against the heated member. The guiding members are sufficiently spaced apart to allow the portion of the photothermographic element between the rotatable rollers to expand and contract. The heated member is moveable and the guiding members are rotatable at rates which approximately match the transport rate of the photothermographic element.

Another embodiment includes a system, adapted for converting data to an image corresponding to the data. The system includes a photothermographic element. The system also includes an imaging device positioned to receive the photothermographic element for converting the data to radiation, and for exposing the photothermographic element on an image-wise basis to the radiation to create an image in the photothermographic element. The system also includes a thermal processor, which includes a moveable heated member positioned to receive the photothermographic element after being exposed by the imaging device and to heat the photothermographic element to at least a threshold development temperature at a throughput rate. The heated member includes a resilient layer having a thickness and thermal conductivity for contacting the photothermographic element. The resilient layer is sufficiently thick so that a foreign particle can be depressed into the resilient layer to reduce an image defect in the image due to insufficient heat transfer causable by the foreign particle. The resilient layer is also sufficiently thin and sufficiently thermally conductive so that the resilient layer delivers to the photothermographic element sufficient heat to thermally develop the photothermographic element at the throughput rate. The thermal processor also includes a heater thermally connected to the heated member for heating the heated member.

Another embodiment includes a system, adapted for converting data to an image corresponding to the data. The system includes a photothermographic element having a substrate having on at least one surface a photothermographic emulsion comprising a binder, a preformed silver halide, a radiation sensitive reducible silver salt, and a reducing agent for the silver ion. The preformed silver halide has a mean average diameter of 0.10 micrometers or less. The system also includes an imaging device for converting the data to modulated radiation representative of the data, and for exposing the photothermographic element on an image-wise basis to the modulated radiation to create an image in the photothermographic element representative of the data. The system also includes a thermal processor, which includes a moveable heated member positioned to receive the photothermographic element to heat the photothermographic element to at least a threshold development temperature at a throughput rate. The heated member includes a resilient layer having a thickness and thermal conductivity for contacting the photothermographic element. The resilient layer is sufficiently thick so that a foreign particle can be depressed into the resilient layer to reduce an image defect in the image due to insufficient heat transfer causable by the foreign particle. The resilient layer is also sufficiently thin and sufficiently thermally conductive so that the resilient layer delivers to the photothermographic element sufficient heat to thermally develop the photothermographic element at the throughput rate. The thermal processor also includes a heater thermally connected to the heated member for heating the heated member.

In an alternative embodiment, the present invention provides a system adapted for converting data to an image corresponding to the data. A photothermographic element has a substrate having on at least one surface a photothermographic emulsion comprising a binder, a preformed silver halide, a radiation sensitive reducible silver salt, and a reducing agent for the silver ion. The preformed silver halide has a mean average diameter of 0.10 micrometers or less. An imaging device is positioned to receive the photothermographic element to convert the data to radiation representative of the data and to expose the radiation on an image-wise basis to the photothermographic element to create the image on the photothermographic element. The thermal processor has a moveable heated member positioned to receive the photothermographic element from the imaging device and to heat the photothermographic element to at least a threshold development temperature for a dwell time to thermally develop the image in the photothermographic element. A heater is thermally connected to the heated member for heating the heated member. A plurality of rotatable guiding members are positioned at guiding positions adjacent to the heated member for biasing the photothermographic element against the heated member, the guiding members being sufficiently spaced apart to allow the portion of the photothermographic element between the rotatable rollers to expand and contract. The heated member is moveable and the guiding members are rotatable at rates which approximately match the transport rate of the photothermographic element.

In an alternative embodiment, the present invention provides a method for thermally developing a photothermographic element to create an image. A moveable heated member is heated to at least a threshold development temperature. The photothermographic element is transported to the heated member at a transport rate. The photothermographic element is biased against the heated member with a plurality of rotatable guiding members for a dwell time to allow the heated member to develop an image in the photothermographic element. Each guiding member assists in reducing pressure markings in the photothermographic element by applying a total biasing force to the photothermographic element of not greater than 200 grams per centimeter of width of the photothermographic element. The heated member and rotating the guiding members are moved at rates which approximately match the transport rate of the photothermographic element.

In an alternative embodiment, the present invention provides a method for thermally developing a photothermographic element to create an image. A moveable heated member is moved to at least a threshold development temperature. The photothermographic element is transported to the heated member at a transport rate. The photothermographic element is biased against the moveable heated member positioned to receive the photothermographic element to heat the photothermographic element to at least a threshold development temperature at a throughput rate. The heated member includes a resilient layer having a thickness and thermal conductivity for contacting the photothermographic element. The resilient layer is sufficiently thick so that a foreign particle can be depressed into the resilient layer to reduce an image defect in the image due to insufficient heat transfer causable by the foreign particle. The resilient layer is sufficiently thin and sufficiently thermally conductive so that the resilient layer delivers to the photothermographic element sufficient heat to thermally develop the photothermographic element at the throughput rate.

In an alternative embodiment, the present invention provides a method for thermally developing a photothermographic element to create an image. A moveable heated member is heated to at least a threshold development temperature. The photothermographic element is transported to the heated member at a transport rate. The photothermographic element is biased against the heated member with a plurality of rotatable guiding members for a dwell time to allow the heated member to develop an image in the photothermographic element. The guiding members are sufficiently spaced apart to allow the portion of the photothermographic element between the rotatable rollers to expand and contract. The heated member and rotating the guiding members are moved at rates which approximately match the transport rate of the photothermographic element.

In an alternative embodiment, the present invention provides a method of making a thermal processor heated member. A thermally conductive cylindrical tube is formed having a wall thickness variation of less than 4 per cent. A support tube is coated with a resilient layer having a thermal conductivity and a first thickness. The resilient layer is ground to a layer thickness having a variation of less than 20%.

In an alternative embodiment, the present invention provides a method for converting data to a visible image corresponding to the data. The data is converted into radiation modulated in a manner representing the data. A photothermographic element is exposed on an image-wise basis to the modulated radiation creating a latent image on the photothermographic element representative of the data. A moveable heated member is heated to at least a threshold development temperature. The photothermographic element is transported toward the heated member at a transport rate. The photothermographic element is biased against the moveable heated member positioned to receive the photothermographic element to heat the photothermographic element to at least a threshold development temperature at a throughput rate. The heated member includes a resilient layer having a thickness and thermal conductivity for contacting the photothermographic element. The resilient layer is sufficiently thick so that a foreign particle can be depressed into the resilient layer to reduce an image defect in the image due to insufficient heat transfer causable by the foreign particle. The resilient layer is sufficiently thin and sufficiently thermally conductive so that the resilient layer delivers to the photothermographic element sufficient heat to thermally develop the photothermographic element at the throughput rate.

In an alternative embodiment, the present invention provides a method for converting data to a visible image corresponding to the data. A photothermographic element is inserted into an imager having a data conversion means, an exposure means, and a thermal processing means. The infrared sensitized photothermographic element has a substrate having on at least one surface a photothermographic emulsion having a binder, a preformed silver halide, an radiation sensitive reducible silver salt, and a reducing agent for the silver ion with the preformed silver halide having mean average diameter of 0.10 micrometers or less. The data is converted into radiation, wherein the radiation is modulated in a manner representing the data. The photothermographic element is exposed to the modulated radiation creating a latent image on the infrared sensitized photothermographic element representative of the data. A moveable heated member is heated to at least a threshold development temperature. The photothermographic element is transported toward the heated member at a transport rate. The photothermographic element is biased against the moveable heated member positioned to receive the photothermographic element to heat the photothermographic element to at least a threshold development temperature at a throughput rate. The heated member includes a resilient layer having a thickness and thermal conductivity for contacting the photothermographic element. The resilient layer is sufficiently thick so that a foreign particle can be depressed into the resilient layer to reduce an image defect in the image due to insufficient heat transfer causable by the foreign particle. The resilient layer is sufficiently thin and sufficiently thermally conductive so that the resilient layer delivers to the photothermographic element sufficient heat to thermally develop the photothermographic element at the throughput rate.

In an alternative embodiment, the present invention provides a method for converting data to a visible image corresponding to the data. The data is converted into radiation modulated in a manner representing the data. The photothermographic element is exposed to the modulated radiation creating a latent image on the photothermographic element representative of the data to have a predetermined optical density. A moveable heated member is heated to at least a threshold development temperature. The photothermographic element is transported to the heated member at a transport rate. The photothermographic element is biased against the heated element for a dwell time to develop the image in the photothermographic element to have the predetermined optical density. The actual optical density of the image is measured. The actual optical density is compared to the predetermined optical density. The output power is adjusted when the actual optical density deviates from the predetermined optical density by a predetermined variation.

In an alternative embodiment, the present invention provides a cooling apparatus adapted for use with heated webs. A first heat sink roller has a first thermally conductive core and a first external layer, the external layer being less thermally conductive and having less thermal mass than the core. A first nip roller is positioned adjacent to the first heat sink roller to form a first nip, the first nip being positioned to receive and conductively cool the heated web.

In an alternative embodiment, the present invention provides a cooling apparatus, adapted to cool a photothermographic element from between 280–230 degrees Fahrenheit to below 160 degrees Fahrenheit at a throughput rate and within a distance while minimizing non-uniform dimensional changes in the photothermographic element due to rapid cooling of the photothermographic element. A first cooling means receives each of the photothermographic elements having a first temperature of between 280–230 degrees Fahrenheit and cools each of the photothermographic elements to between 190–170 degrees Fahrenheit. A second cooling means receives each of the photothermographic elements from the first cooling means and cools each of the photothermographic elements to between 170–150 degrees Fahrenheit. A third cooling means receives each of the photothermographic elements from the second cooling means and cools each of the photothermographic elements to below 160 degrees Fahrenheit. A transport means transports each of the photothermographic elements to the first, second, and third cooling means.

In an alternative embodiment, the present invention provides a method for cooling a photothermographic element. The photothermographic element is transported to a first nip having a first heat sink roller having a first thermally conductive core and a having a first external layer, the external layer being less thermally conductive and having less thermal mass than the core. A first nip roller is positioned adjacent to the first heat sink roller to form the first nip, the first nip being positioned to receive and conductively cool the heated web. The photothermographic element is transported from the first nip to a second nip having a second heat sink roller having a second thermally conductive core and a having a second external layer, the second external layer being less thermally conductive and having less thermal mass than the second thermally conductive core. A second nip roller is positioned adjacent to the second heat sink roller to form the second nip, the second nip being positioned to receive the heated web from the first nip and to further conductively cool the heated web.

In an alternative embodiment, the present invention provides a guide, adapted for guiding an element on a surface of a heated member away from the surface of the heated member, the element having a leading edge and a main portion. A plate has a front edge closely positioned to the surface of the heated member to receive the leading edge of the element when the element is on the surface of the heated member and to guide the element away from the heated member. A roller is positioned adjacent to the front edge of the plate for receiving the leading edge of the heated element from the front edge of the plate and for moving the heated element away from the front edge so that the main portion does not contact the plate. A roller bearing is positionally coupled to the front edge of the plate, the roller bearing being rideable on the surface of the heated member to position the front edge of the plate at a predetermined distance from the surface of the heated member.

In an alternative embodiment, the present invention provides a processor for thermally developing a photothermographic element having an endless and thermally conductive web, a drive mechanism for driving the web, a support for supporting at least a portion of the driven web, a heater for heating the web through the support, a plurality of undriven, freely rotatable, hollow rollers, a resilient surface on at least one of the web and the rollers, mounts for mounting the rollers in a spaced apart, generally parallel orientation opposite the web from the support for movement toward and away from the support and a biasing mechanism for biasing the rollers toward the support to urge the photothermographic element into contact with the heated web during development.

In an alternative embodiment, the present invention provides a photothermographic film processor having a drum having a first diameter, a heater for heating the drum, a drive for rotating the drum, a plurality of undriven, freely rotating, hollow rollers having a second diameter which is less than the first diameter, a layer of resilient, thermally conductive material on the external surface of the drum or the rollers or both the drum and the rollers, mounts for mounting the rollers in a circumferentially spaced, parallel orientation around the drum for movement toward and away from the drum and a biasing mechanism for biasing the rollers toward the drum to urge the film into contact with the drum during development.

In an alternative embodiment, the present invention provides a processor for thermally developing a photothermographic element having an endless and thermally conductive web, a drive mechanism for driving the web, a support for supporting at least a portion of the driven web, a heater for heating the web through the support, a plurality of undriven, freely rotatable rollers, the rollers having means for drawing static electricity from the support, a resilient surface on the web or the rollers or both the web and the rollers, mounts for mounting the rollers in a spaced apart, generally parallel orientation opposite the web from the support for movement toward and away from the support and a biasing mechanism for biasing the rollers toward the support to urge the photothermographic element in to contact with the heated web during development.

In an alternative embodiment, the present invention provides a processor for thermally developing a photothermographic element having an endless and thermally conductive web, a drive mechanism for driving the web, a support for supporting at least a portion of the driven web, a heater for heating the web through the support, a plurality of undriven, freely rotatable rollers, a resilient surface on the web or the rollers or both the web and the rollers, mounts for mounting the rollers in a spaced apart, generally parallel orientation opposite the web from the support for movement toward and away from the support and a biasing mechanism for biasing the rollers toward the support to urge the photothermographic element into contact with the heated web during development, the biasing mechanism providing a pressure of up to 1 pound per eighteen inches width.

In an alternative embodiment, the present invention provides a photothermographic film processor having a drum having a first diameter, a heater for heating the drum, a drive for rotating the drum, a plurality of undriven, freely rotatable rollers having a second diameter which is less than the first diameter, the rollers having means for drawing static electricity from the drum, a layer of resilient, thermally conductive material on the external surface of the drum or the rollers or both the drum and the rollers, mounts for mounting the rollers in a circumferentially spaced, parallel orientation around the drum for movement toward and away from the drum and a biasing mechanism for biasing the rollers toward the drum to urge the film into contact with the drum during development.

In an alternative embodiment, the present invention provides a thermophotographic film processor having a drum having a first diameter, a heater for heating the drum, a drive for rotating the drum, a plurality of undriven, freely rotatable rollers having a second diameter which is less than the first diameter, a layer of resilient, thermally conductive material on the external surface of the drum or the rollers or both the drum and the rollers, mounts for mounting the rollers in a circumferentially spaced, parallel orientation around the drum for movement toward and away from the drum and a biasing mechanism for biasing the rollers toward the drum to urge the film into contact with the drum during development, the biasing mechanism providing a pressure of up to one pound per eighteen inches width.

DETAILED DESCRIPTION OF THE PREFERRED EMBODIMENTS

Figure 1:
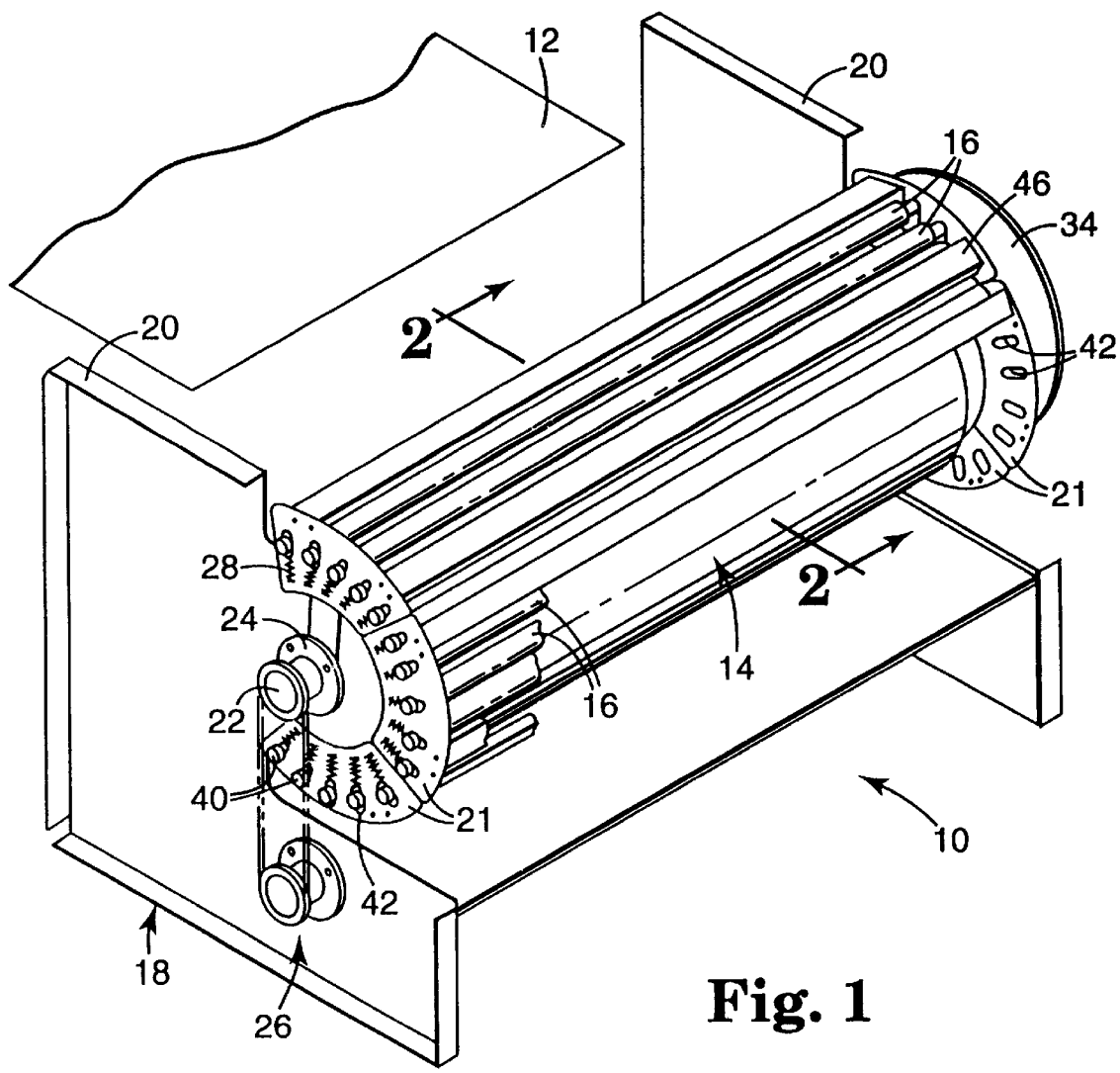
FIG. 1 is a perspective view of a thermal processor constructed in accordance with the present invention.
Figure 2:
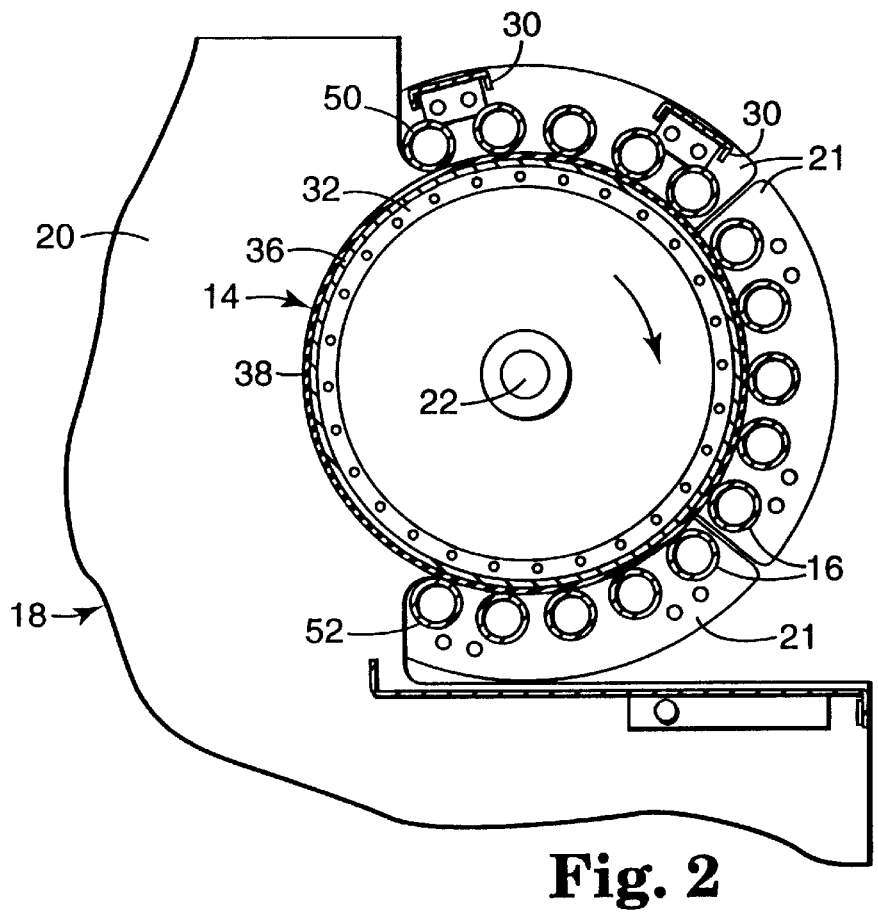
FIG. 2 is a side view of the thermal processor shown in FIG. 1.
Figure 3:
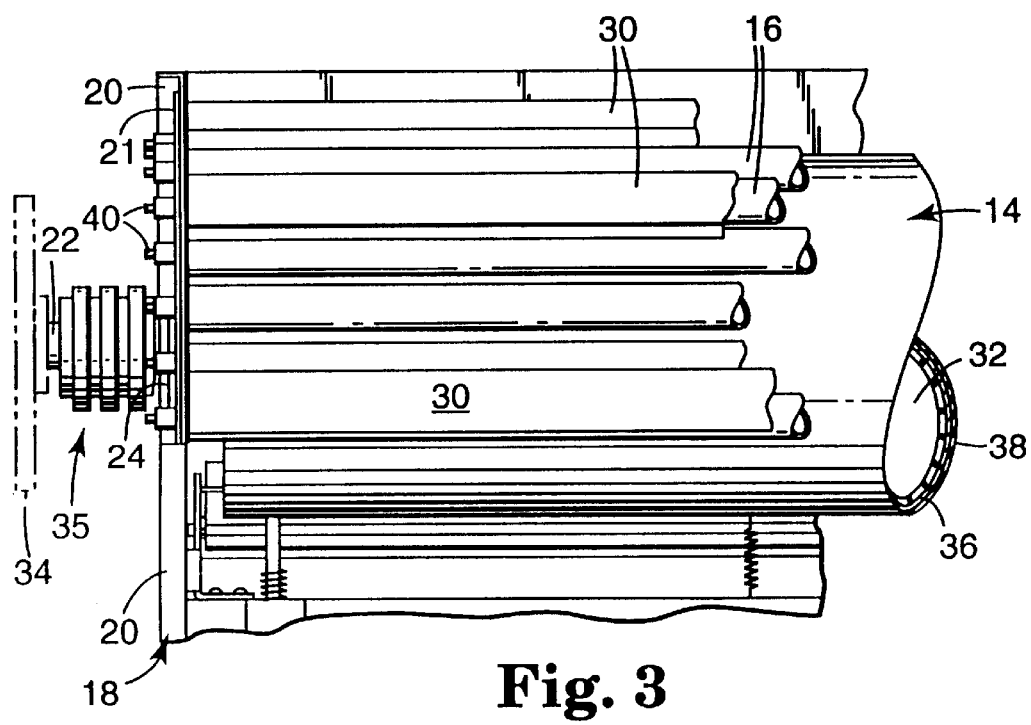
FIG. 3 is a front view of the thermal processor shown in FIGS. 1 and 2.

Thermal processor 10 is shown in FIGS. 1, 2, and 3, for thermally developing an imagewise exposed photothermographic elements 12 such as films or paper, either in sheet form or roll form. Thermally developing photothermographic element 12 creates an image by heating exposed photothermographic element 12 to at least a threshold development temperature and for a particular dwell time. The image can be a visible image created from a latent image. The image can also be an image which is readable by an apparatus. The threshold development temperature is the lowest temperature at which a particular photothermographic element begins to develop. Dwell time is the period of time at which a particular photothermographic element should be maintained at or above the threshold development temperature to develop the image in photothermographic element 12.

Thermal processor 10 can be a stand-alone apparatus used to develop previously imaged photothermographic elements 12. Thermal processor 10 can, instead, be docked to other apparatus, or it can be an integral component of a multi-function apparatus or system.

Generally, thermal processor 10, shown in FIGS. 1–3, can include moveable heated member 14 and guiding members 16 as shown. Guiding members 16 hold photothermographic element 12 against heated member 14 so that heated member 14 transfers sufficient heat for developing photothermographic element 12. Guiding members 16 can be positioned relative to heated member 14 by processor frame 18. Processor frame 18 is shown to include a pair of processor end members 20 and six guide member brackets 21, three on each of end members 20. Heated member shafts 22 extend from the opposite ends of heated member 14 and are rotatably mounted to end members 20 by shaft bearings 24. Heated member 14 is rotated by a motor (not shown) which is coupled to one of shafts 22 by chain drive mechanism 26, although other mechanisms could be used, such as a gear mechanism driven by a micro-step stepper motor. Guide members 16 are supported in a parallel orientation at circumferentially-spaced positions around the outside of heated member 14 by guiding member brackets 21, and are biased into engagement with heated member 14 by springs 28. Each of guiding member brackets 21 shown has five guiding members 16 mounted thereto. Guiding members 16 extend around about 224 radial degrees of heated member 14 in this embodiment. Cross members 30 are mounted between opposed guiding member brackets 20 for added support. A heater, shown as heater blanket 32, and control electronics 34 have been included to properly heat heated member 14. Electric power is coupled to heater blanket 32 and control electronics 34 through a slip ring assembly 35.

Heated member 14 is shown as being a rotatable cylindrical drum. Other shapes are contemplated. For example, heated member 14 could be a moveable, supported belt having a flat surface so that photothermographic element 12 is flat while being heated. However, cylindrical heated member 14 or heated member 14 having some other type of curved shape can allow for heating of photothermographic element 12 within a limited space. The width of heated member 14 should preferably be chosen to thermally develop the entire width of photothermographic element 12. The diameter of cylindrical heated member 14 should be chosen in conjunction with the desired throughput rate and the desired compactness of thermal processor 10. Similarly, the contact length and shape of an irregularly curved or a flat, supported belt can be chosen based on these considerations.

Heated member 14 shown in FIGS. 1–3 includes aluminum support tube 36 with resilient layer 38 on the exterior of support tube 36. Support tube 36 shown is approximately 18 inches long (45.7 centimeters), 0.25 inch (0.64 centimeters) wall thickness, and has a outer diameter of approximately 6.375 inches (16 centimeters). A larger diameter tube 36, such as 8 inches (20.3 centimeters) and a smaller diameter tube 36, such as 3.5 inches (8.9 centimeters) have also been shown to work. Even larger and smaller sized support tubes could be used. Preferably, the wall thickness of support tube 36 varies by no more than, for example, four percent.

Resilient layer 38 has a sufficiently smooth surface to minimize the formation of patterns on photothermographic element 12 being processed. Preferably, the surface roughness is not more than 250 microinches (6.3 micrometers), and more preferably not more than 125 microinches (3.2 micrometers). On the other hand, the surface roughness for some materials, such as silicone-based materials should not be significantly less than 75 microinches (1.9 micrometers), and more preferably not less than 90 microinches (2.3 micrometers) to prevent photothermographic element 12 from sticking to heated member 14. In addition, a surface roughness of above 90 microinches (2.3 micrometers) allows gases, and particularly, volatile materials, to out-gas more easily from between resilient layer 38 and photothermographic element 12.

The coefficient of static friction between resilient layer 38 and photothermographic element 12 should be sufficiently high in order to grab and transport photothermographic element 12 when nipping the leading edge of photothermographic element 12 with the first of guiding members 16. This coefficient of static friction should be selected to match the force applied by the first of guiding members 16.

Resilient layer 38 is sufficiently thermally conductive to maintain a uniform temperature on the surface of heated member 14 to allow for a practical throughput rate. In one embodiment, resilient layer 38 is preferred to have a thermal conductivity equal to or greater than 4 BTU-inch/hr-ft$^2$-°F. (0.59 Watts/cm$^2$-°C.). This allows thermal processor 10 to thermally develop 8-mil (0.2 millimeters), 14"×17" (35.6 centimeters×43.2 centimeters) photothermographic elements 12 (as described later in example 1) at a throughput rate of at least 120 photothermographic elements per hour (heated member diameter of approximately 6.375 inches (16 centimeters); approximately 224 degrees of circumference of heated member 14 in contact with photothermographic element 12). For a similar photothermographic material having a size of 8"×10" (20.3 centimeters×25.4 centimeters), the throughput rate can exceed 200 photographic elements per hour (with same heated member diameter and contact). For a paper-based photothermographic element, the throughput rate using resilient layer 36 can exceed 300–11"×14" (27.9 centimeters×35.6 centimeters) photothermographic elements per hour (with same heated member diameter and contact).

The throughput rate for another size of photothermographic elements relates to that size. Furthermore, increasing the diameter of heated member 14 would allow for higher throughput rates. In addition, throughput rate can be looked as a unit area per unit time (e.g., square centimeters per hour) instead of a number of photothermographic elements 12 per unit time.

In addition to throughput rate, resilient layer 38 allows for an acceptable period of time for warm-up of thermal processor 10. For example, a support tube 36, having an 18-inch long (45.7 centimeters), 0.25 inch (0.64 centimeters) wall thickness, an outer diameter of approximately 6.375 inches (16 centimeters), together with a resilient layer 38, having a thickness of approximately 0.030 inch (0.076 centimeters), is heatable to above approximately 250 degrees Fahrenheit within 20 minutes.

A modeling analysis suggests that the thermal conductivity of the resilient layer has a significant influence on the thermal transfer rate to reach a steady state temperature in a film. This will in turn influence the time required to reach the threshold development temperature as well as the dwell time necessary to fully develop the image in photothermographic element 12. The following one dimensional modeling analysis was performed comparing the temperature variations as a function of time for two different resilient layer conductivity values:

Model Dimensions and Conditions:

Resilient layer thickness: 0.030" (0.762 millimeters)

Element base thickness: 0.007" (0.18 millimeters)

Initial element temperature: 70° F. (21.1° C.)

Boundary conditions consisted of fixing a 250° F. (121.1° C.) temperature on the inside edge of the resilient layer 38 and applying a natural convection boundary condition for normal air with a bulk temperature of 70° F. (21.1° C.) on the outside edge of photothermographic element 12. Initial conditions were constructed such that the temperature of resilient layer 38 was at steady state when the 250° F. (121.1° C.) temperature was applied at the inside edge of resilient layer 38 and a natural convection (h=0.88 Btu/hr-ft$^2$-°F.; 0.13 Watts/cm$^2$-°C.) was applied on the outside edge of resilient layer 38 before photothermographic element 12 was introduced.

To capture the transient temperature response correctly, thermal contact resistance was modeled to account for the resilient layer-to-photothermographic element heat transfer by conduction.

As developed in the reference (J. P. Holman, Heat Transfer, 6th Edition, 1986, McGraw-Hill, Inc., New York, N.Y.), thermal contact resistance through the gap is defined by:

$$1/h_c A$$

where $h_c$ is the contact coefficient and A the total cross sectional area. To simplify the model, $h_c$ was set to:

$$h_c = 0.20 K_{air}/T_{film}/100$$

where $K_{air}$ is the conductivity of the air and $T_{film}$ is the photothermographic element thickness.

Figure 4:
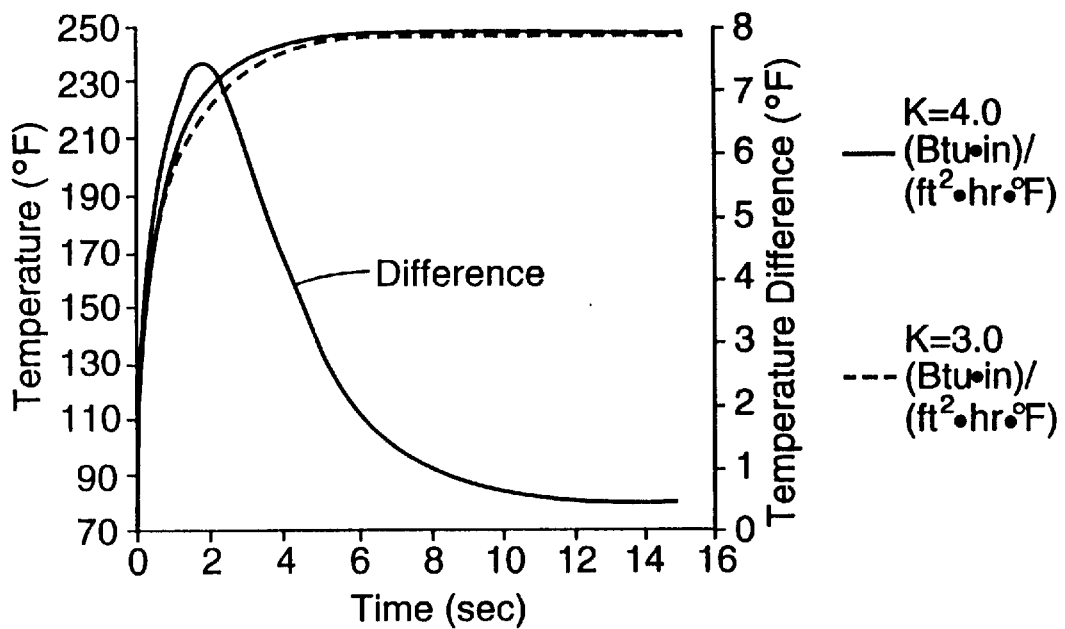
FIG. 4 is a graph showing the effect of different thermal conductivities of a resilient layer within the thermal processor shown in FIGS. 1–3.

FIG. 4 shows a comparison of photothermographic element 12 temperature variation when resilient layer 38 has conductivities of 3.0 and 4.0 BTU-inch/hr-ft$^2$-°F. (0.44 and 0.59 Watts/cm$^2$-°C.). Resilient layer 38 with the higher conductivity showed a faster warm up response for photothermographic element 12.

Photothermographic element 12 with the lower conductivity resilient layer reached 99.9% of its final steady state temperature in approximately 9.65 seconds whereas the higher conductivity silicone took 7.45 seconds. The maximum temperature difference between them was calculated to be 7.40° F. (−13.6° C.).

Figure 5:
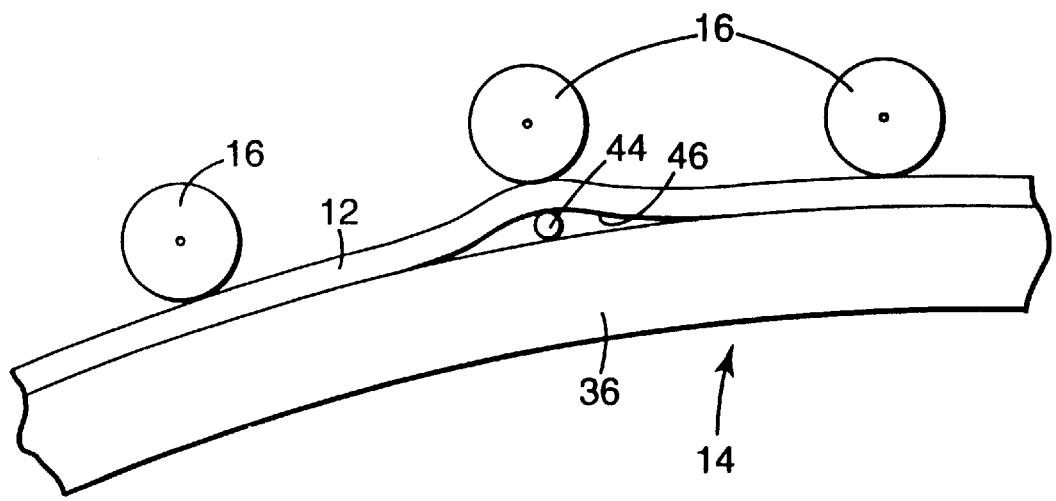
FIG. 5 is a schematic view of an air gap between a photothermographic element and a low resilience heated member caused by the presence of a foreign particle.

In addition to thermal conductivity, the durometer of resilient layer 38 allows thermal processor 10 to develop a high quality image in photothermographic element 12. Trapped foreign particle 44, shown in FIG. 5, between photothermographic element 12 and a low resilience heated member 14 (e.g., aluminum) can cause non-uniform development of the image. Foreign particle 44, if sufficiently large (e.g., >0.001 inch (0.0254 millimeters) in size), causes photothermographic element 12 to be suspended above the surface of heated member 14 creating air gap 46 surrounding particle 44. In this non-contact area photothermographic element 12 will not receive sufficient heat to fully develop the image thus creating a non-uniform area.

Figure 6:
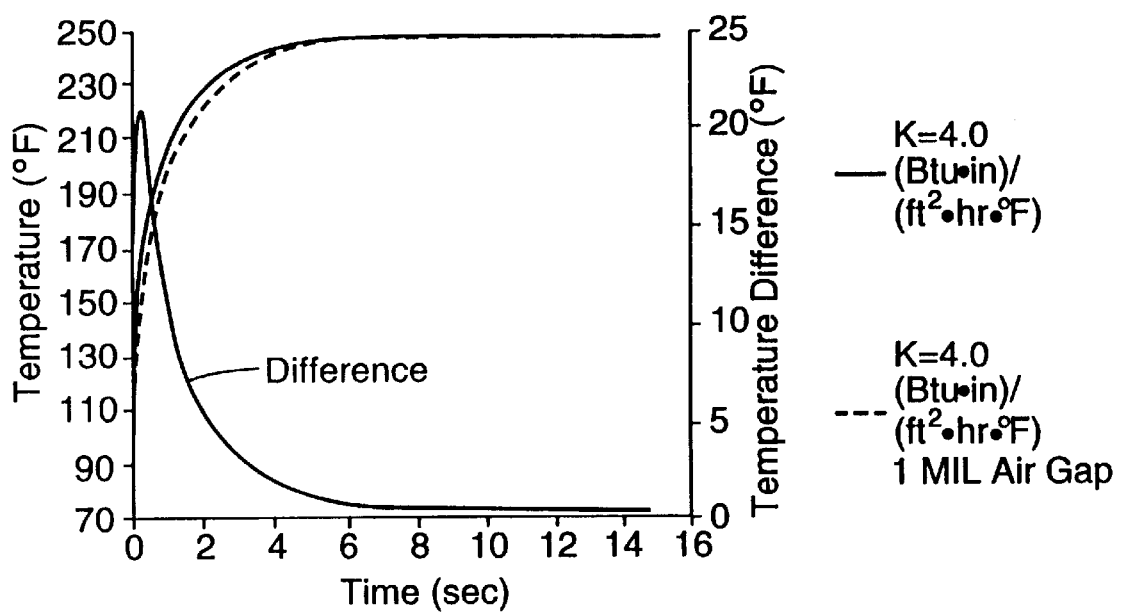
FIG. 6 is a graph showing the effect of an air gap between a photothermographic element and a resilient layer within the thermal processor shown in FIGS. 1–3.
Figure 7:
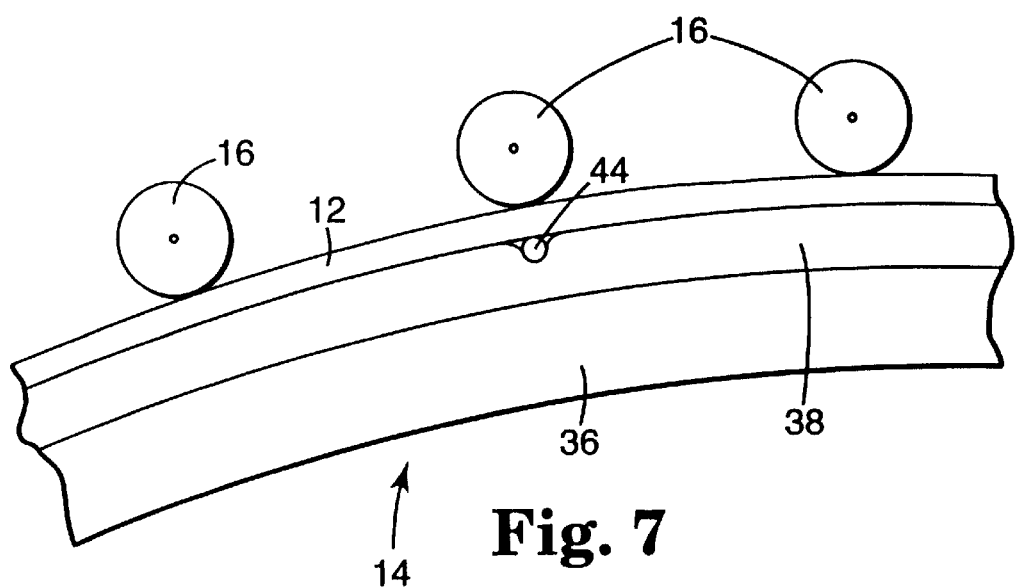
FIG. 7 is a schematic view of a smaller air gap between a photothermographic element and the resilient heated member, shown in FIGS. 1–3, when compared with FIG. 4.

FIG. 6 shows the effect that a 0.001 inch (0.025 millimeter) air gap would have on the heat transfer rate to photothermographic element 12 using the theoretical modeling analysis described earlier. The air gap results show that it took approximately 8.17 seconds to warm up to 99.9% of the element's final steady state temperature. As shown in Figure 7, this defect can be reduced or eliminated by using resilient layer 38 on heated member 14 which allows particle 44 to be depressed into resilient layer 38 thus allowing more uniform contact with photothermographic element 12.

Larger particles 44, such as those having a size greater than 0.010 (0.25 millimeters) or even 0.050 inch (1.27 millimeters), can be depressed within resilient layer 38, thereby reducing the image defect. However, the ability to completely eliminate a visible defect decreases when the particle size approaches this size. In this case, the presence of particles 44 of this size can be reduced by other means, such as a proper enclosure surrounding thermal processor 10 and an internal filtering system.

Resilient layer 38 provides sufficient depressibility without sacrificing wear resistance. Resilient layer 38 has a hardness of preferably less than 70 Shore A durometer, more preferably less than 60 Shore A durometer, and even more preferably less than 55 Shore A durometer. Two particular silicone-containing materials, having a dopant to increase thermal conductivity, have been found to be particularly useful, such as Silicone #10-3040 (X-040) from Robinson Rubber of Minneapolis, Minn., USA, or W852 from Winfield Industries, Inc., Buffalo, N.Y., USA.

Although the silicone within these materials has a relatively low thermal conductivity, the silicone provides the depressibility and durability. Other base materials could be substituted. Sufficient dopant is added to obtain a thermal conductivity to maximize the throughput rate. The amount of dopant added, however, is balanced to optimize thermal conductivity for throughput rate, depressibility for defect reduction, and durability for wear resistance. Silicone containing materials have the added advantage of providing release properties and chemical inertness to photothermographic element 12.

The dopant can also provide greater electrical conductivity to resilient layer 38. This is useful for handling static build-up.

The thickness of resilient layer 38 is such that sufficient defect reduction can be achieved without significantly affecting throughput rate. The thickness of resilient layer 38 is preferably between 0.010 and 0.060 inch (0.25 and 1.5 millimeters). An even thinner resilient layer 38 is feasible, but the ability to reduce defects by a thinner layer and the manufacturability of a thinner layer should be considered. For the doped silicone material previously mentioned, the thickness may be preferably between 0.025 and 0.040 inch (0.64 and 1.0 millimeters), and more preferably between 0.027 and 0.033 inch (0.69 and 0.84 millimeters) to provide the balance of defect reduction and throughput rate. In addition, the thickness of resilient layer 38 preferably varies over the surface area by not more than 20%, more preferably by not more than 10%, and even more preferably be not more than 5%. Preferably, the roundness run-out is minimized.

Guiding members 16 shown within this embodiment are rotatable rollers, although other forms of guiding members 16, such as small movable belts could also be used if the effects of belt patterns and seams is eliminated or reduced to acceptable level. Guiding members 16 in one embodiment are aluminum and tubular having an 0.86 inch (2.18 centimeters) outer diameter and 0.04 inch (0.1 centimeter) wall thickness. In another embodiment guiding members 16 have a 0.93 inch (2.36 centimeters) outer diameter and 0.04 inch (0.1 centimeter) wall thickness. The hollow nature of guiding members 16 helps prevent heat transfer to minimize the heat contributed by guiding members 16 during development. Rather than hollow, guiding members 16 could be solid or filled, but preferably such that they would have minimal thermal mass.

A conductive coating such as nickel plating can be applied to the exterior surface of guiding members 16 to draw static electricity from heated member 14. Guiding member shafts 40 extend into the ends of guide members 16 also extend into elongated openings 42 in guiding member brackets 21 and enable guiding members 16 to freely rotate. Guide member shafts 40 can also be conductive and coupled to ground to provide a discharge path for static electricity that could otherwise build up on guide members 16 or heated member 14. Elongated openings 42 are radially aligned with shafts 22 of heated member 14, enabling guiding members 16 to move toward and away from heated member 14.

Springs 28 couple the ends of each guiding member shaft 40 to guide member brackets 21 to urge guiding members 16 toward heated member 14 and to allow each end of each guiding member 16 to be moveable independent of the other end of guiding member 16. Springs 28 are selected so that each guiding member applies a particular force per inch of width of photothermographic element 12 to photothermographic element 12 when being heated by heated member 14. The force should be sufficiently large to hold photothermographic element 12 against heated member 14 so that a uniform transfer of heat from heated member 14 to photothermographic element 12 allows for uniform development. Without sufficient force, surface imperfections on heated member 14 and/or guiding members 16 as well as imperfections within photothermographic element 12 can cause portions of photothermographic element 12 to receive non-uniform heat transfer and development. Non-uniform heat transfer and developments causes the formation of undesirable development patterns, such as mottle areas.

Insufficient force can also result in guiding members 16 not rotating, in the case of idling guiding members. When this occurs and guiding members 16 still contact photothermographic element 12 when moving over heated member 14, guiding members 16 can scratch photothermographic element 12.

On the other hand, the force applied by each guiding member 16 should not exceed a magnitude which causes pressure markings on photothermographic element 12. The magnitude which causes pressure markings can be dependent on the make-up of the photothermographic element being developed. Pressure markings and mottle areas are examples of unacceptable defects for those seeking image uniformity.

In addition, the spring force provided by each of the springs 28 when used in guiding members 16 positioned around cylindrical drum-type heated member 14 shown, can be chosen to compensate for the force of gravity on each of guiding members 16. For example, a spring 28, which is biasing guiding member 16 resting on top of heated member 14, requires less spring force to apply the same total force to photothermographic element 12 than does another spring 30, which is biasing guiding member 16 upwardly against the bottom of heated member 14.

To reduce or eliminate pressure marking defects while also reducing or eliminating mottle-type defects, and other pressure-related defects, one embodiment can be constructed so that the force applied to photothermographic element 12 by each guiding member 16 ranges from 7.2 to 200 grams per centimeter of width of photothermographic element 12. More preferably, the force should range between 7.2 to 100 grams per centimeter of width of photothermographic element 12. Even more preferably, the force should range between 14 and 30 grams per centimeter of width of photothermographic element 12. In addition, the preferred force within this range depends on balancing the reduction of the mottle-type defects with the pressure marking defects. In some applications, one type of defect may be more undesirable than the other. And, the formulation of the photothermographic emulsion of photothermographic element 12 can determine the sensitivity of that particular photothermographic element 12 to insufficient pressure and to excessive pressure.

Applying 7.2 grams per centimeter of photothermographic element 12 was shown to eliminate the pressure marking and mottle defects when an 18-inch (45.7 centimeters) long guiding member 16 applied a total biasing force of 5.58 grams across a 14-inch (35.6 centimeter) wide photothermographic element 12 (described later in Example 1). Applying 73.1 grams per centimeter was also shown to produce no pressure marking and mottle defects, for example, when an 18 inches (45.7 centimeters) long guiding member 16 applied a total biasing force of 44.65 grams across an 11-inch (27.9 centimeter) wide photothermographic element 12 (described later in Example 1). A higher nominal force, such as above 200 grams per centimeter, is feasible. However, the risk of pressure marking defects increases especially when considering the likelihood of force variation during continuous and extended use, and especially when using pressure-sensitive photothermographic elements.

A lower nominal force than previously mentioned is also feasible. However, the risk of mottle defects increases, again, especially when considering likely variation from the nominal force. In addition, insufficient force can result in non-rolling guiding member 16 which can further result in surface scratching to photothermographic element 14.

In addition to the force applied by each guiding member 16, the spacing between adjacent guiding members 16 can be important for the development of high quality images on photothermographic element 12. When fed to heated member 14, photothermographic element 12 is generally at room temperature (approximately 70° F., 21.1° C.). To maximize the throughput of thermal processor 10, heated member 14 should quickly heat photothermographic element 12 from room temperature up to at least the threshold development temperature, for example 200° F. (93.3° C.) in order to begin development.

However, the base material included in some photothermographic elements 12 can experience both thermal expansion and shrinkage (or contraction) when heated, for example polyester film-based or other thermoplastic-based elements. For uniform dimensional change which prevents wrinkling, photothermographic element 12 should be uniformly heated while being alternated between being unconstrained and being held flat. To do this, multiple guiding members 16 are spaced sufficiently to allow the areas of photothermographic element 12 between the adjacent guiding members 16 to change dimension while not being constrained between guiding members 16 and heated member 14.

But, as previously noted guiding members 16 should hold photothermographic element 12 against heated member 14 for a dwell time in order for sufficient and uniform heat transfer to occur to uniformly develop photothermographic element 12. As a result, the spacing between adjacent guiding members 16 should be chosen so that wrinkling is minimized, but also so that heating of photothermographic element 12 occurs quickly and uniformly.

For curved or cylindrical drum-type heated member 14, adjacent guiding members 16 should be sufficiently close to control the tendency of the leading edge of photothermographic element 12 to straighten when between guiding members 16. This is important in order to keep photothermographic element 12 between guiding members 16 and heated member 14. As shown in FIGS. 1–3, fifteen guiding member 16 are shown positioned around 224 radial degrees of heated member 14, thereby individually spacing 16 radial degrees apart, center to center. This embodiment has been shown to work for relatively stiff photothermographic elements 12, such as those having a 7-mil (0.18 millimeter) polyester film base thickness as well as for less stiff photothermographic elements 12, such as those having a 4-mil (0.10 millimeter) polyester film base thickness when the diameter of heated member 14 is between 3.5 inches (8.9 centimeters) and 8 inches (20.3 centimeters) and the diameter of guiding members 16 is approximately 0.86 inch (2.18 centimeters).

A similar embodiment, where thirty guiding members 16 were used in place of the fifteen (half-spaced), provided greater capture and development of the leading edge of photothermographic element 12. On the other hand, a greater spacing than the above embodiments can be used. The spacing is balanced with the diameter of heated member 14, the thickness of photothermographic element 12, and the heat transfer required. More than three, or more preferably, more than 10 guide members 16 are contemplated to provide sufficient contact of photothermographic element 12 with heated member 14 to achieve development of photothermographic elements 12 at an optimized throughput rate.

The spacing between the first guiding members 16 which contact photothermographic element 12 can be smaller than the spacing between downstream guiding members 16. This arrangement can better hold photothermographic element 12 to heated member 14 when not yet fully heated and still relatively stiff.

Still further, the spacing between adjacent guiding members 16 also allows for additional out-gassing of volatile materials present between heated member 14 and photothermographic element 12. When photothermographic element 12 is heated, as by contact with heated member 14, volatile materials within photothermographic element 12 can create pockets of vaporized material between photothermographic element 12 and heated member 14, causing non-uniform heat transfer. Gases can escape more easily from the portions of photothermographic element 12 located between and unconstrained by adjacent guiding members 16.

Heater blanket 32 is one form of a heater which can be thermally connected to heated member 14 (i.e., capable of heating heated member 14) to heat heated member 14, although others would suffice. An example of heater blanket 32 is a resistive etched foil heater blanket 32 for heating heated member 14. Heater blanket 32 shown can include a number of independently controlled zones (not visible in FIGS. 1–3) to ensure temperature uniformity across heated member 14 where photothermographic element 12 contacts. Heater blanket 32 includes two 1.5 inch (3.8 centimeters) wide zones on the ends of the tube and a 15 inch (38.1 centimeters) wide central zone. Each of the zones includes an RTD sensor (also not shown). Heater blankets 32 of this type are commercially available from a number of manufacturers such as Minco, Inc. of Fridley Minn. While this embodiment refers to three heated zones, it is contemplated that fewer or greater zones could be used as long as temperature uniformity is satisfactory. In addition, while the temperature across heated member 14 which photothermographic element 12 passes and contacts (i. e., cross-web temperature uniformity) should be uniform, heated member 14 can be constructed and/or controlled in a way to create desirable temperature differential between circumferential portions of heated member 14 (i.e., downweb temperature non-uniformity). Alternatively, heated member 14 can be shaped and/or controlled in a way to create downweb temperature uniformity.

Heater control electronics 34 can rotate with heated member 14 and regulate the supply of electrical power to heater blanket 32 in response to sensed temperature information. Heater blanket 32 and control electronics 34 should be capable of attaining and maintaining a range of temperatures on the surface of heated member 14 suitable for the development of a particular photothermographic element 12 for which thermal processor 10 is configured. In one embodiment, heater blanket 32 and control electronics 34 can heat heated member 14 to temperatures between 60° C. and 160° C. (140° F. and 320° F.), and should maintain the temperature across the heated member to within 5° F. (2.78° C.), and more preferably to within 2° F. (1.1° C.), and more preferably to within 1° F. (0.55° C.). For photothermographic elements 12 having a wider thermal latitude, the larger tolerances are allowable.

Use of thermal processor 10 includes feeding undeveloped photothermographic element 12 into the nip formed by heated member 14 and upstream guiding member 16 (i.e., nip 50 in FIG. 2). Photothermographic element 12 having a photothermographic emulsion on one side (or both sides) is developable when fed into thermal processor 10 with either the emulsion side toward or away from resilient layer 38, although it is preferred to have the emulsion side toward resilient layer 38. Photothermographic element 12 then rotates with heated member 14 while guiding members 16 urge photothermographic element 12 toward heated member 14 and keep photothermographic element 12 in contact with heated member 14 for a dwell time during this rotation.

Because guiding members 16 and heated member 14 can move at approximately the same rate as photothermographic element 12 being developed, marring of the surface of photothermographic element 12 is reduced or eliminated. This is important when high quality images are desired.

After being transported between heated member 14 and guiding members 16, developed photothermographic element 12 can be withdrawn from thermal processor 10 as it emerges from the nip formed by the most downstream guiding member 16 and heated member 14 (i.e., nip 52 in FIG. 2).

Thermal processor 10 can be configured to develop various photothermographic elements 12, for example, an infrared sensitized silver halide photothermographic emulsion coated on a 7-mil (0.178 millimeters) polyester substrate (as described later in Example 1). Heated member 14 is maintained at a temperature of between 240° F. and 280° F. (115.6° C. and 137.8° C.), for example 255° F. (123.9° C.), and rotated at a speed which keeps photothermographic element 12 in contact with heated member 14 for a dwell time of about 15 seconds. With this dwell time and this heated member temperature, photothermographic element 12 can be raised to a temperature of approximately 255° F. (123.9° C.). The thickness and thermal conductivity of resilient layer 38 are chosen to allow for continuous processing of multiple photothermographic elements 12 at a particular throughput rate.

These parameters, of course, can be varied with the particular characteristics of photothermographic element 12 being developed and the throughput goals desired. For example, the temperature and rotation rate of heated member 14 can be varied as well as the dwell time for which photothermographic element 12 contacts heated member 14 in order to develop a photothermographic element 12 having different development requirements. In addition, both heated member 14 and guiding members 16 can have a resilient layer, or guiding members 16 can be have a resilient layer while heated member 14 has a less resilient exterior surface. Plus, thermal processor 10 could be reconfigured so that the rotating rollers were heated members 14 and the cylindrical drum or the flat, supported endless belt could act as guiding member 16. It is preferred that the photothermographic emulsion layer of photothermographic element 12 contact resilient layer 38, however the opposite side of photothermographic element 12 could also be in contact with resilient layer 38. In addition, it is also preferred that the photothermographic emulsion layer of photothermographic element 12 contact heated member 14, however the opposite side of photothermographic element 12 could also be in contact with heated member 14.

Following thermal development of the image, preferably photothermographic element 12 can be lifted and guided away from the surface of heated member 14 and toward, for example, a cooling apparatus. However, it is important that the structure used to lift and guide photothermographic element 12 cause little or no marring, that is, surface abrasion. In addition, this structure preferably should counteract the curling tendency of photothermographic element 12 after being heated on the curved surface of heated member 14 shown in FIGS. 1–3.

Figure 8:
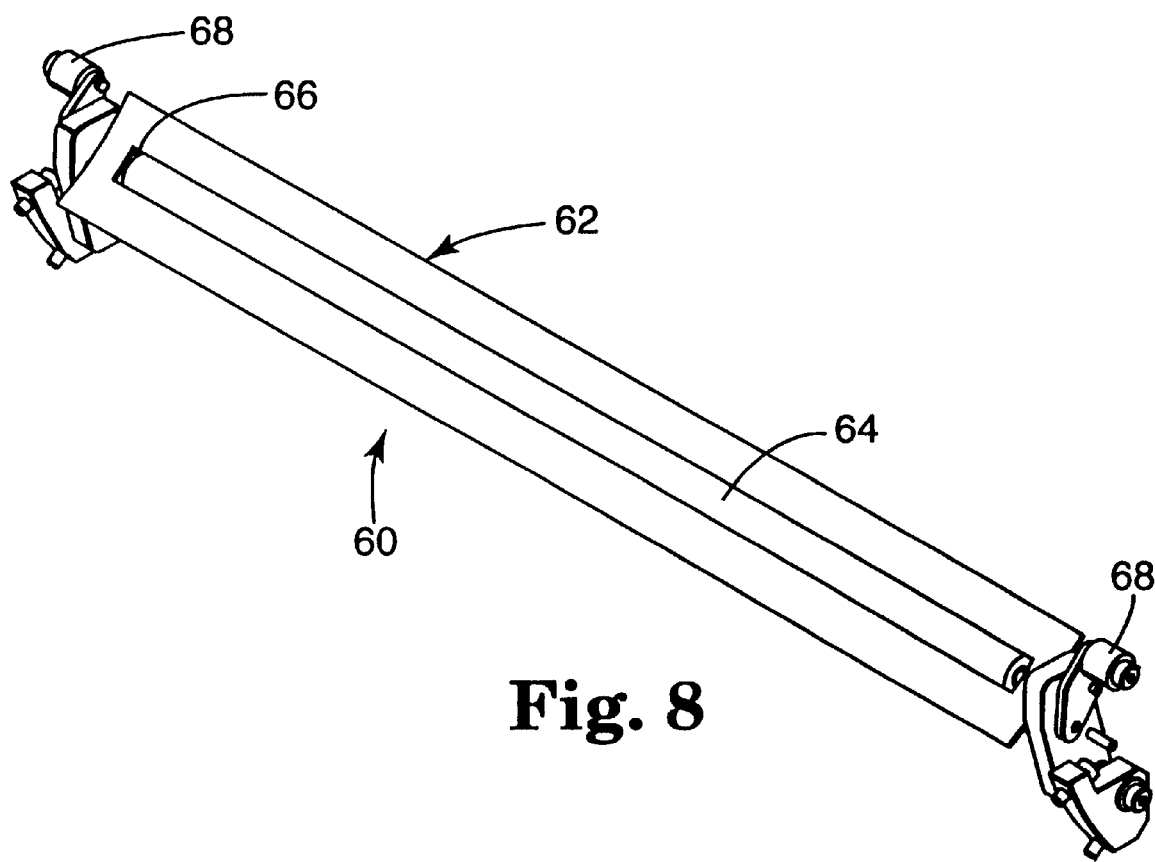
FIG. 8 is a perspective view of an element guide which can be a part of the thermal processor shown in FIGS. 1–3.
Figure 9:
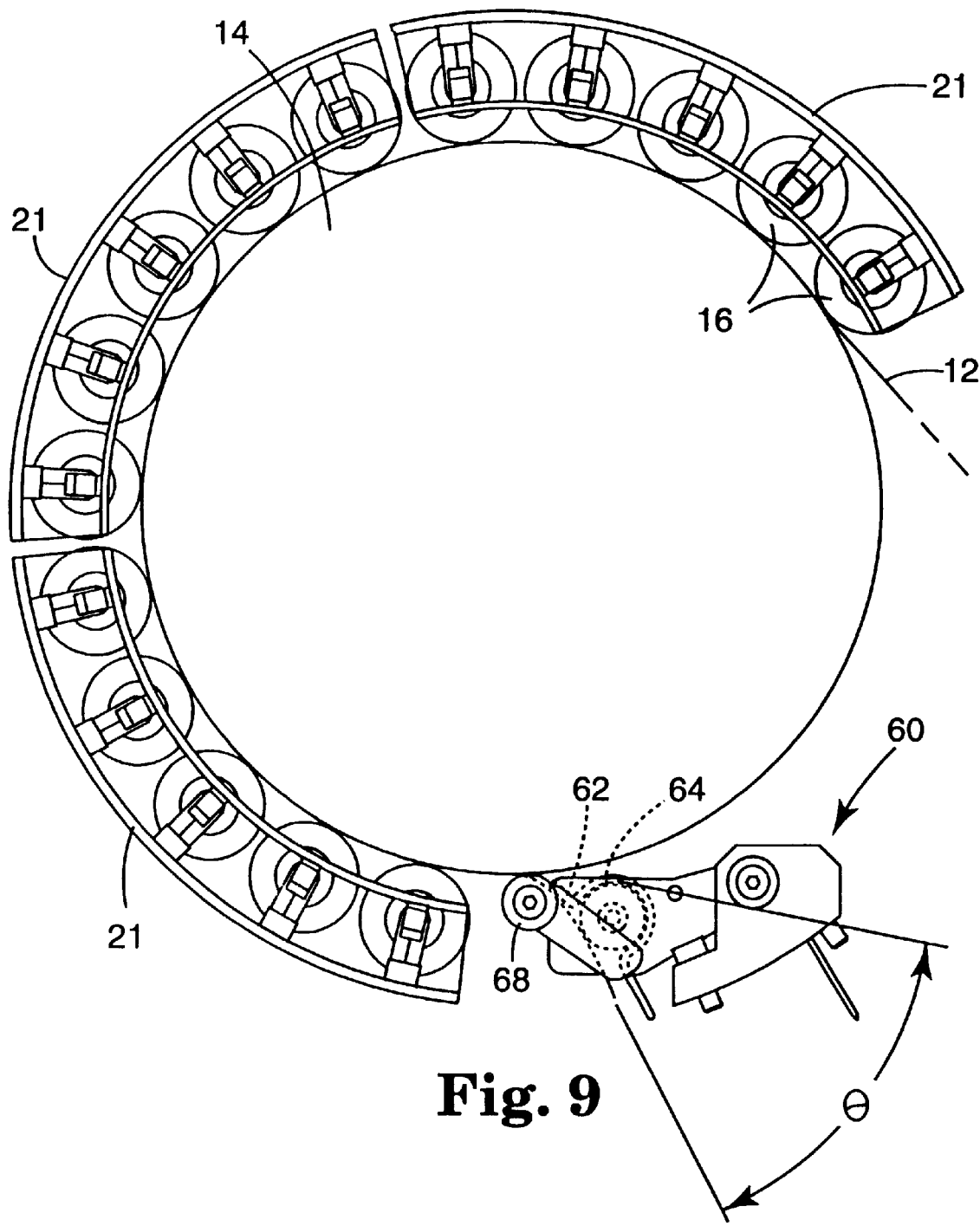
FIG. 9 is a side view of the element guide, shown in FIG. 8, against a heated member.

Element guide 60, shown in FIGS. 8 and 9, addresses both needs. Element guide 60 includes guide plate 62 and guide roller 64 which rests within guide roller slot 66 in guide plate 62. Element guide 60 can be biased near heated member 14. As shown, element guide 60 also includes guide bearings 68 which roll on heated member 14 and position guide plate 62 at a fixed distance from heated member 14. This prevents guide plate 62 from contacting heated member 14 and potentially damaging the surface of heated member 14. In addition, element guide 60 can be sufficiently rigid so that a user can wipe away foreign matter from element guide 60 without it flexing to a point where it contacts heated member 14.

Element guide 60 can guide the leading edge and a main portion of photothermographic element 12. Guide plate 62 receives the leading edge of photothermographic element 12 when photothermographic element 12 is on said surface of heated member 14. In one embodiment, the fixed distance between guide plate 62 and heated member 14 is approximately 0.005 inch (0.127 millimeters) so that the leading edge of an 0.008 inch (0.203 millimeters) thick photothermographic element 12 in intimate contact with heated member 14 can strike guide plate 62 and buckle over guide plate 62 toward guide roller 64. Guide roller 64 can receive the leading edge from guide plate 62. Due to its position, guide roller 64 can rotate and move photothermographic element 12 away from the surface of guide plate 62 so that the remaining or main portion of photothermographic element 12 does not come in contact with guide plate 62. This prevents marring of the remaining or main portion of photothermographic element 12 by the fixed nature of guide plate 62. Guide roller 64 can be made of Willtec foam material available from Illbruck Inc., Minneapolis, Minn.

The angle θ, shown in FIG. 9, at which element guide 60 guides photothermographic element 12 away from heated member 14 is important to minimize the curl created due to the heating and cooling of photothermographic element 12. The flatness of photothermographic element 12 after being developed can depend on the angle at which the heated photothermographic element 12 is removed from heated member 14 and the temperature gradient within the photothermographic element 12 during the cooling process. In order to develop photothermographic element 12 with a dynamic curl (ANSI standard test PH1.29-1985) of preferably not more than 0.4 inch (10.0 millimeters) and more preferably not more than 0.2 inch (5.0 millimeters), photothermographic element 12 should not be subjected to abrupt changes in temperature as photothermographic element 12 is transported off heated member 14. In an ideal situation photothermographic element 12 is allowed to slowly equilibrate over an extended transport distance. It has been found that, for photothermographic element 12 (as described later in Example 1) having a thickness of 0.008 inch (0.20 millimeters), the angle θ should preferably be at least 10 degrees and more preferably between 10 and 50 degrees to achieve an acceptable flatness. For photothermographic element 12 having a different type and caliper of base material or emulsion/imaging layer, this angle θ may vary.

Figure 10:
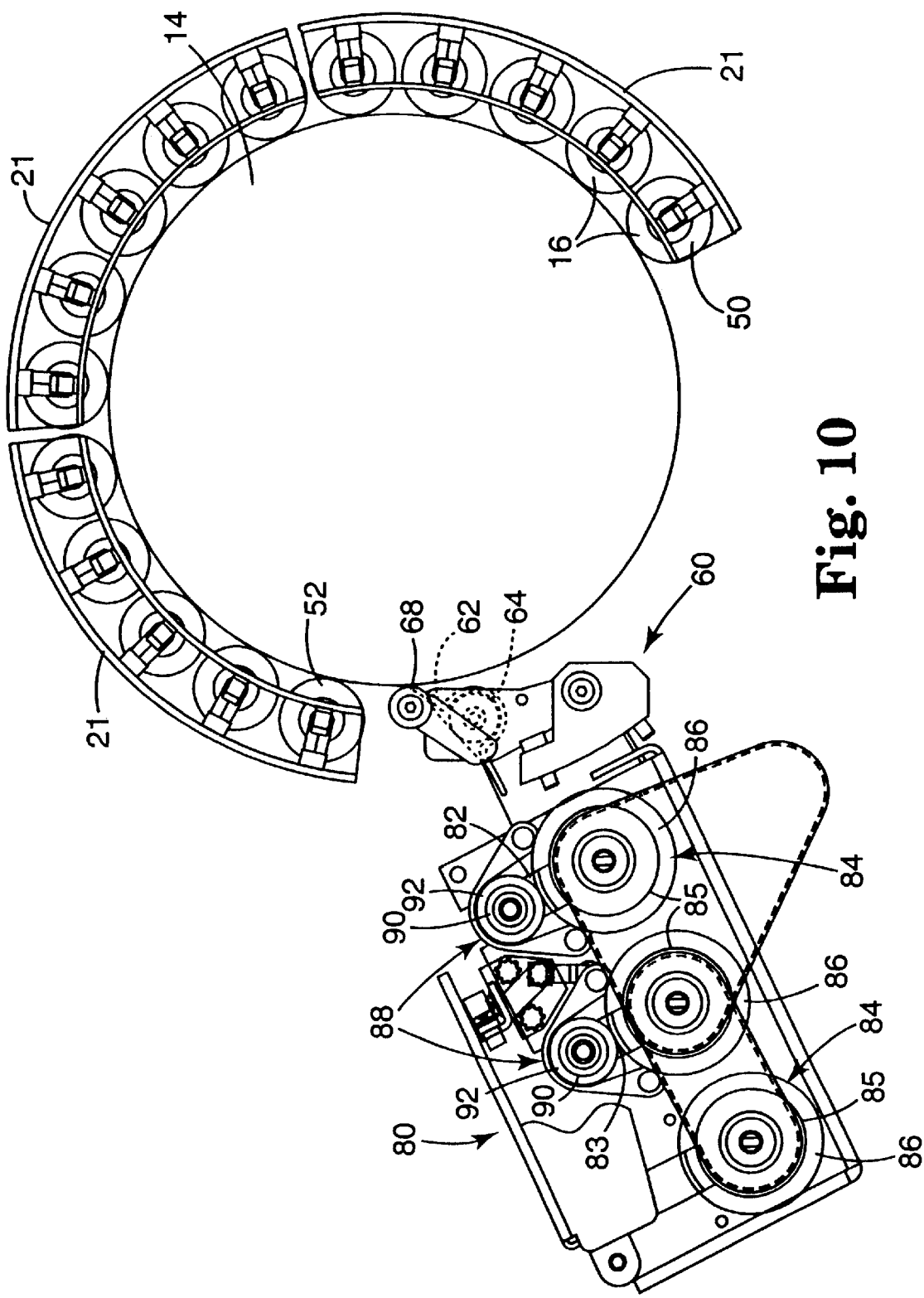
FIG. 10 is a perspective view of a cooling apparatus which can be a part of the thermal processor shown in FIGS. 1–3.

Element guide 60, as mentioned, can guide photothermographic element 12 to cooling apparatus 80, such as that shown in FIG. 10. To allow for a minimum apparatus footprint and maximum apparatus throughput, it is preferred that photothermographic element 12 be cooled within a short distance and within a short time. However, the rate of cooling is controlled so that significant temperature gradients are not introduced within photothermographic element 12 which could cause undue stress resulting in non-uniform changes in dimension or wrinkling. The cooling rate is controlled such that photothermographic element 12 does not experience abrupt temperature changes until the temperature of photothermographic element is below the glass transition temperature of the film base.

The cooling rate and flatness of photothermographic element 12 can be controlled by transporting photothermographic element 12 into cooling apparatus 80 shown in FIG. 10. Cooling apparatus 80 includes a set of rollers 84, 88 which cool and maintain the flatness of photothermographic element 12. One possible configuration includes first nip 82 which can receive and begin to conductively cool photothermographic element 12 coming from, for example, previously mentioned element guide 60. First nip 82 can forward photothermographic element 12 to a second nip 83 which conductively cools photothermographic element 12 further. Because rollers 84, 88 rotate at approximately the same rate as the transport rate of photothermographic element 12 (like guiding members 16 and heated member 14), marring of the surface of photothermographic element 12 is reduced.

The first and second nips 82, 83 can each include a heat sink roller 84 over which photothermographic element 12 passes. Heat sink rollers 84 have heat sink roller core 85 and lower conductivity external layer 86. The first and second nips 82, 83 can also include nip roller 88, having nip roller core 90 and nip roller outer layer 92. Nip roller outer layer 92 can be a material such as Willtec foam available from Illbruck Inc., Minneapolis, Minn.

Second nip 84 can forward photothermographic element 12 to another heat sink roller 84 over which photothermographic element 12 also passes. This heat sink roller 84 can be used to complete the cooling, although additional nips could be used if needed.

In one embodiment, lower thermal conductivity layer 86 is a 0.060 inch (0.15 centimeter) urethane coating onto heat sink roller core 85 made of solid aluminum and having a length of 15 inches (38.1 centimeters) and a diameter of approximately 1.3 inches (3.3 centimeters). In this embodiment, the urethane transfers the heat more slowly and serves as a buffer between the heated photothermographic element 12 and the aluminum core which has a higher thermal conductivity and thermal mass. Other combinations of thicknesses and materials can be used to provide the same cooling effect and for a particular throughput rate.

In one embodiment, a third heat sink roller 84 is also preferably a urethane-coated aluminum roller, although if uncoated, the aluminum would increase the final cooling effort.

This stepped or gradual cooling using this embodiment of cooling apparatus 80 allows for a cooling throughput of greater than 120 14 inches×17 inches (35.6 centimeters× 43.2 centimeters) photothermographic elements 12 per hour. (See description of photothermographic element 12 in Example 1.) Equally important, this cooling apparatus 80 can cool these photothermographic elements 12 within a length of 8 inches (20.3 centimeters) from heated member 14 allowing for minimal use of floor space or table space (footprint).

As previously mentioned, thermal processor 10 can be used in combination with other apparatus used with photothermographic elements 12. For example, thermal processor 10 may be a module to be connected in sequence with an imaging device or an integral part of that device. The imaging device could be one that provides imagewise exposure of the paper or film by transmission of actinic radiation (e.g. light) through a negative transparency, projection of digitized laser emissions, electrostatic charge imaging or any other source of imaging energy that would form a latent image which is subsequently to be thermally developed. Both the imaging device and thermal processor 10 may also be part of a further system wherein electronic information may be initially provided from a camera, video cathode tube, line data transmission or any other source which can then be converted to an imagewise exposure on photothermographic element 12 in the imaging device.

Semiconductor laser diodes are used extensively in photographic imaging devices in both the Medical and Graphic Arts market, in medical imagers and imagesetters, respectively. Current Graphic Arts imagesetters utilize infrared laser diodes of typically 5–30 milliwatt power, while the present 3M medical laser imager typically uses a 15 or 30 milliwatt Infrared laser diode for silver halide applications. The use of semiconductor laser diodes follows from the well established application of conventional lasers (argon ion, helium-neon, etc.) in silver halide imaging devices. The increasing popularity of solid state semiconductor laser diodes derives from their greater convenience, reduced size, higher cost-effectiveness, longer service life, ability to easily be modulated and continuous tone capability.

Narrow beams of radiation are used to provide spot exposures on photothermographic elements 12 to generate latent images which are thermally developed in thermal processor 10. These narrow beams expose spots on the photothermographic elements 12 (e.g., less than 600 micrometers Full Width Half Maximum (FWHM) spots, preferably less than 500 micrometers FWHM, more preferably less than 250 micrometers FWHM and most preferably less than 150 micrometers FWHM in medical diagnostic imaging and less than 150 micrometers FWHM, more preferably less than 100 micrometers FWHM, and most preferably less than 50 micrometers FWHM in graphic arts imaging). When the area of these spots overlaps the area of other spots, increases in film speed, contrast, and image quality of the image are produced on photothermographic element 12. The process for multiple raster scanning by narrow beams or coherent radiation is described in U.S. patent application Ser. No. 08/198,970, Mohapatra, et. al., filed on May 6, 1994 and titled "Improved Imaging Process for Imaging Materials".

The light emitted by a coherent radiation source such as a laser or a laser diode appears to be monochromatic, of fairly uniform beam width, and of somewhat consistent spot shape (from a given radiation source). However, in the reality of imaging, there are imperfections in the spot of light. The coherent light sources are effectively turned on and off for each spot or pulse to be generated.

Additionally, the light spot is not usually moved from point to point, with the radiation source "off" when the direction of the imaging source is moved. The source may move steadily and the radiation turned on and off as the spot is moved along the focal plane. This can give the spot an appearance other than the emitted shape from the source, and the energy distribution within the spot is not idealized (that is, it is more Gaussian than uniform throughout the area of the spot). The advantages of using a monochromatic radiation source are well known in the art.

The movement of the scan, in combination with the energy gradient driving the imager will also cause a distribution of energy within a spot. Perpendicular to the direction of the fast scan (at the top and bottom of a horizontally moving spot) and along the direction of movement there will be a lower energy at the trailing edge of a spot (the first edge of a spot generated by a pulse) and the leading edge of a spot (the last edge of a spot generated during a pulse) as compared to the physical or statistical center of a spot. In addition to the limitations of speed and other sensitometry imposed upon image quality by photothermographic elements 12, these variations in radiation sources do not naturally combine to form a high quality imaging system with coherent radiation exposed photothermographic elements 12.

The normal exposure time or dwell time of a pixel (which may comprise a number of spots within an ordered pattern or array) is often on the order of 0.1 (e.g., 0.01 to 1) microseconds. The dwell time (pulse rate) for the pixels is usually between 0.02 and 10 microseconds for medical diagnostic imaging applications and usually less than 0.10 microseconds for graphic arts applicatons, the larger numbers indicating a less preferred slow imaging system where lower powered impulses may be used because of the needs of a particular imaging system. In the practice of the present invention a pixel rate of 0.03 to 6 is preferred, 0.05 to 5 more preferred, and 0.08 to 3 most preferred to take maximum advantage of the practice of the present invention. Of course, as improvements in media, coherent light sources, spectral absorbers, hardware, software, and the like become commercially available, this range could well shift. The pixel exposure time is dependent upon the speed of the spot as it moves along the focal plane. The spot velocity is usually between 1 and 1000 meters/sec. The various characteristics of the pulse and imaging process are generally related as the higher the output of the coherent radiation source, the shorter need be the pixel exposure time and the faster may be the spot velocity.

The power output of the coherent light source generally should be able to provide an impulse of at least 600 ergs/cm$^2$ at the focal plane of the imaging device from one (usually) or more light sources (e.g., point sources such as a laser or laser diode). At the present level of technology, the radiation source should be between at least 400 ergs/cm$^2$ up to about 4000 ergs/cm$^2$. A preferred range for energy output would be between about 600 to 3000 ergs/cm$^2$ per impulse at the focal plane of the imaging device. The power output of the laser diode as a function of the current through the laser diode should ideally be linear and have a dynamic range ($P_{Max}$ to $P_{Min}$) of greater than 50 to 1, more preferably greater than 100 to 1 and most preferably greater than 200 to 1. The spots are generated from the diode by providing a current (e.g., multiple continuous or single pulses) to the diode which corresponds to the data, coming at 1 to 20 Megahertz, to reproduce 8–12 bit (256 to 4096) grey levels for continuous tone printing. Additionally, the laser diode is superimposed with a high frequency oscillation to cause laser line width broadening greater than 1 nanometer, preferably greater than 2 nanometers and more preferably between 2–6 nanometers. The line broadening reduces the interference artifacts observed on the photothermographic element 12. In order to cause line broadening, the oscillation amplitudes are driven below the knee of the power versus current characteristics of the laser diode. The maximum amplitude of the oscillation current should be at least twice the average power required to produce an optical density on the photothermographic element 12 greater than 2.5. At this optical density level, the interference related image artifacts are not visible to the human eye. The oscillation frequency of the laser diode should be significantly higher than the data rate to sustain significant line broadening and reduce image artifacts. Typical oscillation frequencies are in the range of 300 to 800 Megahertz.

For medical diagnostic imaging applications, the system performance of the photothermographic elements 12, imaging device and thermal processor 10 is balanced in such a way to achieve an optimum image quality, which includes producing images with at least 64, more preferably at least 128, and most preferably at least 256 grey levels, a minimum density of less than 0.25 optical density units, a maximum density of greater than 2.6 optical density units, resolution of more than 3 line pairs per millimeter, and an image uniformity of less than or equal to 0.15 change in optical density within a 14 inches×17 inches (35.5 centimeters×43.1 centimeters) image area at a specific optical density within a range of 0.50 and 3.0 optical density. In addition the unexposed and final imaged photothermographic elements 12 have a dynamic curl (ANSI standard test PH1.29-1985) of less than 20 millimeters, preferably less than 0.4 inch (10 millimeters) and more preferably less than 0.2 inch (5 millimeters), and no visible scratches or wrinkles.

Optical density uniformity is controlled by the performance characteristics of photothermographic element 12 in combination with the exposure variations of the imaging device and the temperature control of thermal processor 10. The optical density uniformity of photothermographic element 12 can be influenced by the coating formulation as well as the coating process. The rheology of the coating formulation is optimized to achieve uniform thickness of the coating across the sheet or web. The turbidity or haze of the coating is minimized to reduce light scattering within the coated layers. The sensitometric response of the photothermographic emulsion is optimized to perform within the limitations of the exposure latitude of the imaging device and processing latitude of thermal processor 10. The thermal processing latitude of photothermographic element 12 is determined by comparison of the optical density versus the log of the exposure time at a range of development temperatures. The photothermographic emulsion formulation and thermal processor 10 conditions are chosen for the best match of thermal processing latitude of photothermographic element 12 versus the temperature control of thermal processor 10. The temperature of thermal processor 10 is controlled to a temperature variation of less than or equal to 5° F. (2.78° C.), preferably less than or equal to 3° F. (1.7° C.), more preferably less than or equal to 2° F. (1.1° C.) and most preferably less than or equal to 1° F. (0.55° C.). The temperature of thermal processor 10 is controlled by a temperature controller such that the thermal equilibrium conditions are re-established in a very short time to minimize sheet to sheet and within a sheet of photothermographic element 12 optical density variations, especially at high throughput rates. An example of a temperature controller is described in U.S. Patent Application 3M File No. 50810USA7A, Tanamachi, et. al., filed on May 9, 1994 and titled "Apparatus for Controlling the Temperature of and a Moveable, Electrically Heated Object".

Exposure (number of photons of a predetermined energy per unit area per unit time) variations in the imaging device may also influence optical density uniformity. A 2% exposure variation can result in a 0.01 to 0.02 change in optical density. The exposure variation is minimized by controlling the consistency of the laser diode emission, the use of high frequency modulation of the laser, monitoring the beam power and the use of look up tables. The optical density non-uniformity caused by various sources such as galvanometer scanners 122, 124 in a 2D laser scanner 112 or due to polarization induced reflectance changes is measured across the fast scan direction x. Corresponding exposure corrections for optical density non-uniformities are stored in an erasable programmable read-only memory within the electronics of the laser scanner 112. These corrections are used as dynamic multipliers to the actual spatial laser exposure values. The imaging device is controlled to an exposure variation of less than or equal to 6%, preferably less than or equal to 4% and most preferably less than or equal to 2%.

Photothermographic element 12 is formulated and coated to achieve a change in optical density of less than or equal to 0.1. An example of a preferred photothermographic element 12 is described in example 1. Knowing the limitations introduced by each of the components of the system, the system can be balanced to achieve an optical density uniformity of less than or equal to 0.30 optical density units, more preferably less than or equal to 0.20 optical density units and most preferably less than or equal to 0.15 optical density units at a specific optical density.

Figure 11:
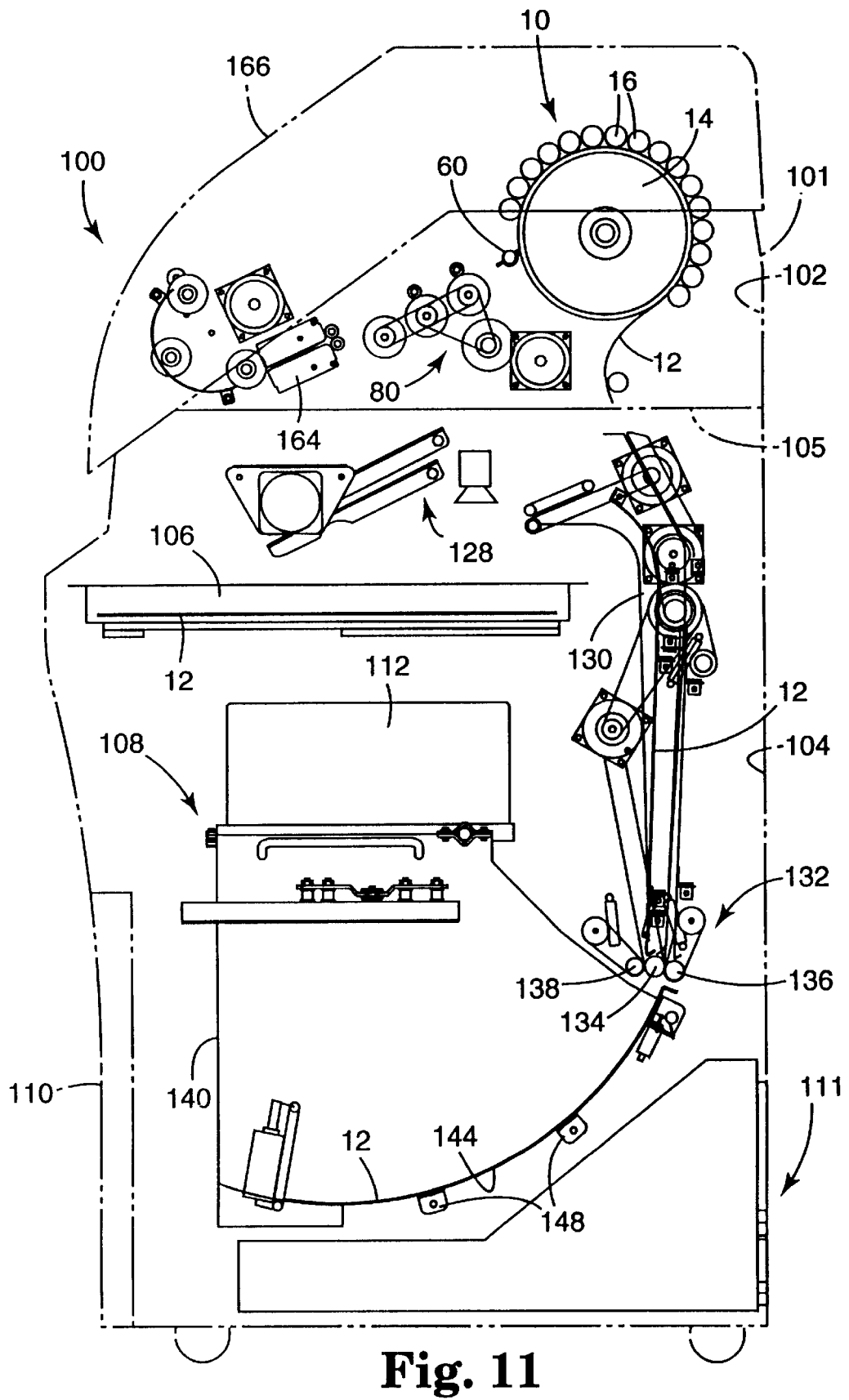
FIG. 11 is a side view of the internal operational portions of an apparatus which includes a thermal processor and a optical scanning module.

An embodiment of the present invention illustrated in FIG. 11 describes an apparatus 100 which can be used in conjunction with photothermographic element 12 described in example 1 to meet the system performance targets for medical diagnostic imaging applications. As shown, apparatus 100 includes cartridge 106 containing at least one photothermographic element 12, an optical scanning module 108, electronics module 110, and integrated thermal processor 10 enclosed in enclosure 101.

Cartridge 106 contains unexposed photothermographic elements 12. An optical bar code (not shown) with a unique cartridge 106 identification, photothermographic element 12 size, photothermographic element 12 type information and photothermographic element 12 sensitometric information, is attached to the bottom surface of cartridge 106. Information is read from the bar code as cartridge 106 is opened. The image management subsystem (not shown), which is part of electronics module 110, controls laser scanner 112 as a function of the input data and the sensitometric information read from the bar code. The image management subsystem also causes thermal processor 10 to develop photothermographic element 12. The image management subsystem may also set the thermal processor 10 conditions to develop photothermographic element 12 as a function of photothermographic element 12 type information read from the bar code. The system for scanning the bar code and controlling the information is described in U.S. Pat. No. 5,229,585.

Photothermographic element 12 is transported out of cartridge 106 by suction feed mechanism 128. Photothermographic element 12 is then fed into staging area 130 where photothermographic element 12 is transported by bidirectional film staging mechanism 132 (described later) into optical scanning module 108. Staging area 130 allows the positioning of photothermographic element 12 near optical scanning module 108 so that photothermographic element 12 is ready to be fed into optical scanning module 108 without operating suction feed mechanism 128 during the scanning of a previously fed photothermographic element 12. This helps to eliminate the vibrations which may cause artifacts in the final image. It also increases productivity in the imaging process by staging photothermographic element 12 in a queue position ready for entry into optical scanning module 108.

Figure 13:
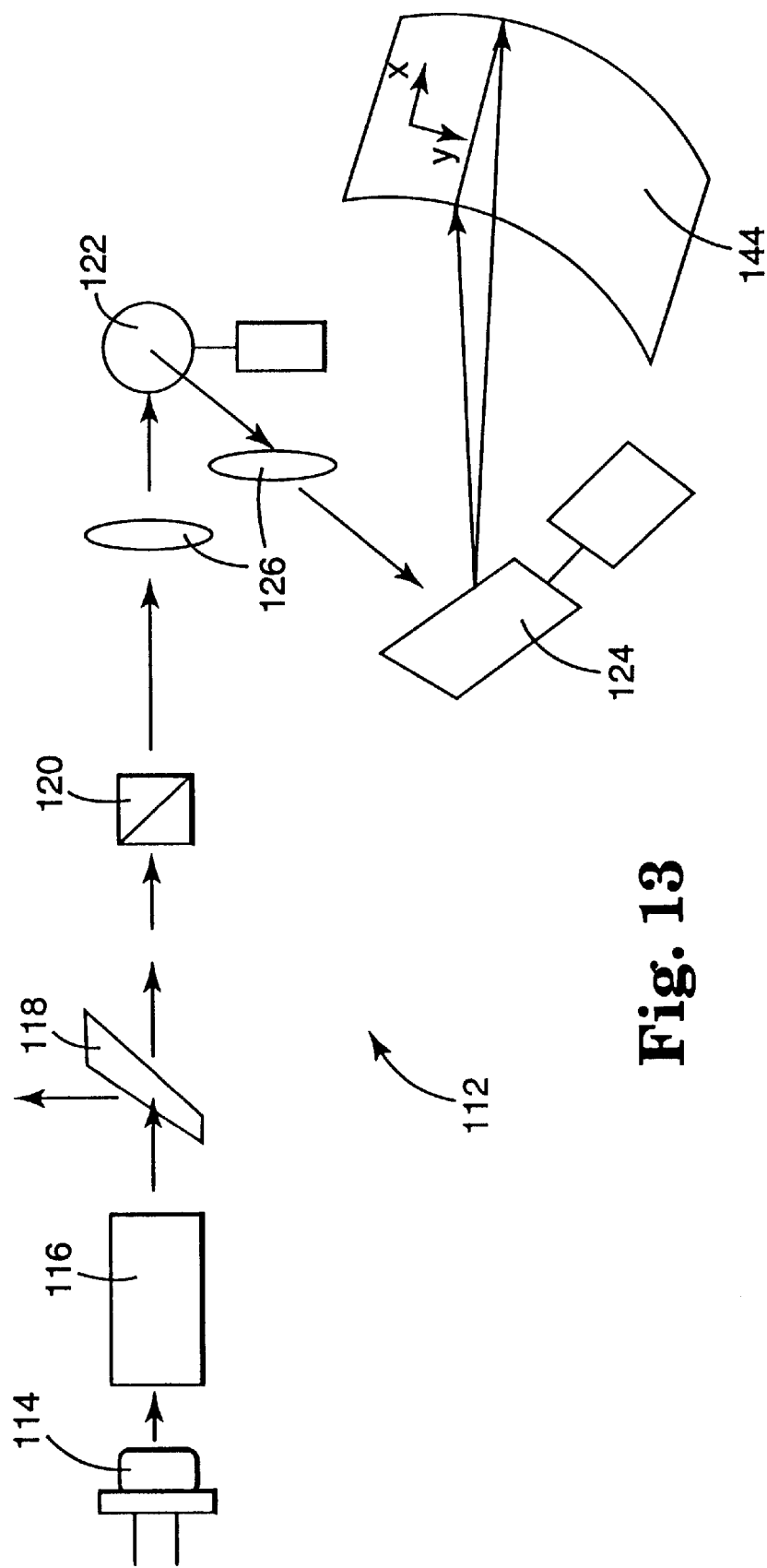
FIG. 13 is a schematic view of a laser scanner which is a part of the optical scanning module shown in FIG. 12.

Optical scanning module 108 includes laser scanner 112 shown in FIG. 13. Laser scanner 112 includes laser diode 114 with collimating and polarizing optics 116, beam splitter 118 which splits 2–10% of the main beam for feedback to laser diode 114 for linearizing laser scanner 112, attenuator 120 to control the maximum power at the surface of film platen 144, resonant galvanometer scanner 122 to scan the beam in the fast scan direction x and linear galvanometer scanner 124 to scan the beam in the slow scan direction y on photothermographic element 12 which is statically disposed on film platen 144. A set of lenses 126 between the attenuator 120 and galvanometer scanners 122,124 are used to focus the beam on film platen 144 with flat field correction across the slow scan direction y. Representative 2-D Infrared laser scanners 112 are described in U.S. Pat. Nos. 4,750,045, 5,237,444 and 5,121,138.

Laser scanner 112 uses multiple exposures and preferably multiple scanning to improve image quality. Multiple scanning is implemented by scanning several smaller overlapping spots to create a single pixel line. This improves sensitometric performance of most photothermographic elements 12 and improves image sharpness. Additionally, modulation transfer function of photothermographic elements 12 with minimal reciprocity problems is improved by this technique because of a reduction in scan line artifacts. Optical scanning module 108 typically uses triple scanning for creating a single pixel line. For a 78 micrometer pixel line, the spot size is approximately 45 micrometers×60 micrometers, the larger dimension being the spot size in the slow scan direction y. Suitable scaling can be easily accomplished for different pixel sizes. Overlapping three, four, five, six, etc. spots to create the same pixel size is also possible.

Figure 12:
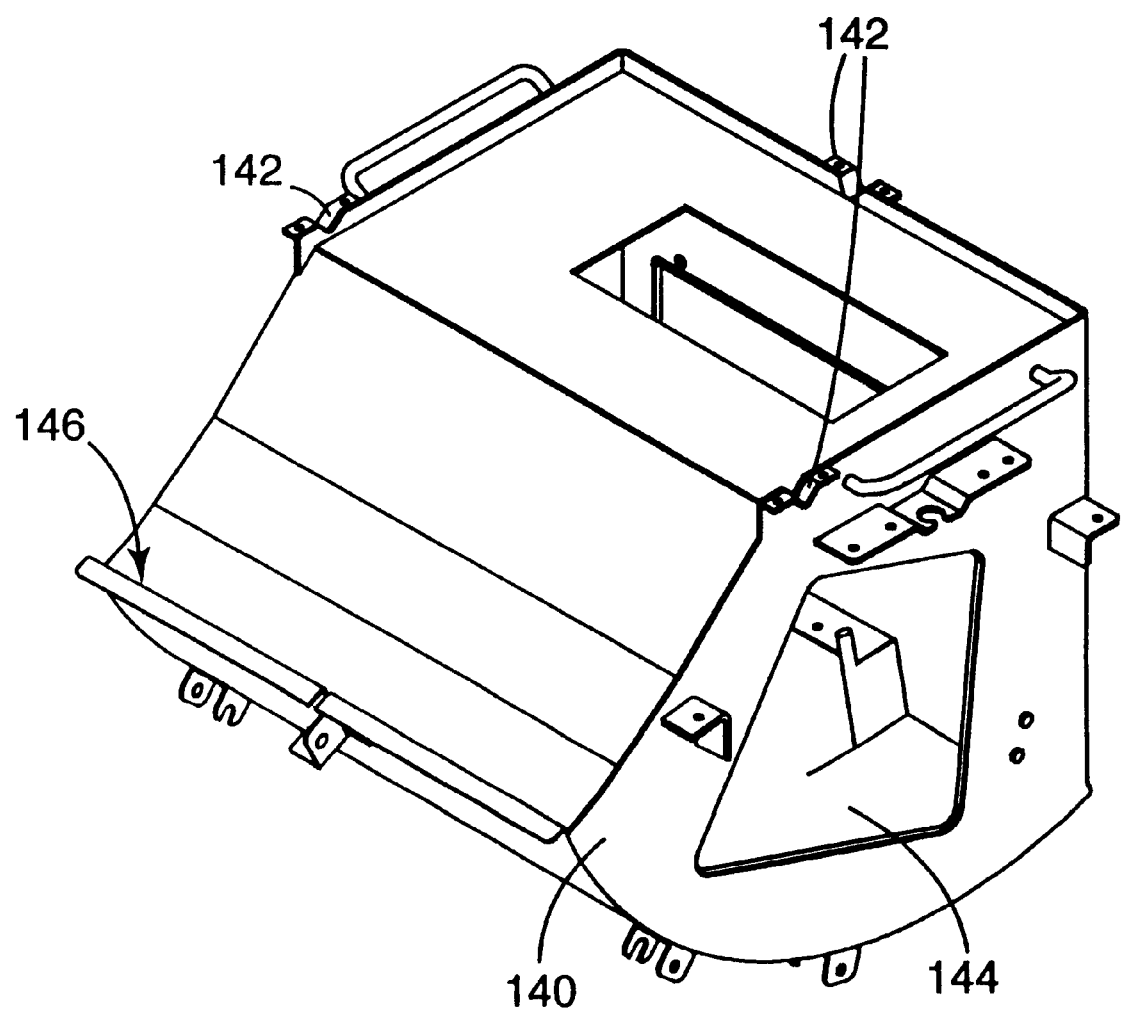
FIG. 12 is a view of an optical scanning module which is shown as a part of the apparatus shown in FIG. 11.

Laser scanner 112 is mounted onto optical frame 140, shown in FIG. 12, for aligning and holding photothermographic element 12 during the image scanning process. Optical frame 140 is constructed from a rolled sheet metal which is welded to a box-shaped housing. The use of welds in place of joints helps to eliminate a potential source for vibration. 2-D Infrared laser scanner 112 is mounted at three V-clamp points 142. Photothermographic element 12 can be transported onto cylindrical film platen 144 through film feed slot 146 where photothermographic element 12 is scanned by the laser. The surface of film platen 144 is coated with a light absorbing material to reduce the reflection of the laser beam which causes undesirable halation effects in the image. When an infrared laser is used as the radiation source, infrared sensitized photothermographic elements 12 are particularly sensitive to halation at wavelengths of 800–820 nanometers due to the high spectral transmittance at wavelengths of 800–820 nanometers of photothermographic element 12. The light absorbing material preferably has a low reflectivity at the wavelength spectrum of radiation source. In addition, the light absorbing material is preferably abrasion resistant and has a low coefficient of friction. The static and kinetic coefficient of friction between the photothermographic element 12 and the light absorbing surface of film platen 144 is preferred to be less than 0.2. An example of a preferred light absorbing material, which has a very low reflectivity (less than 5% spectral reflectance) below 900 nanometers, is Impreglon 218C available from E. I. Dupont De Nemours & Co., Wilmington, Del.

Figure 14:
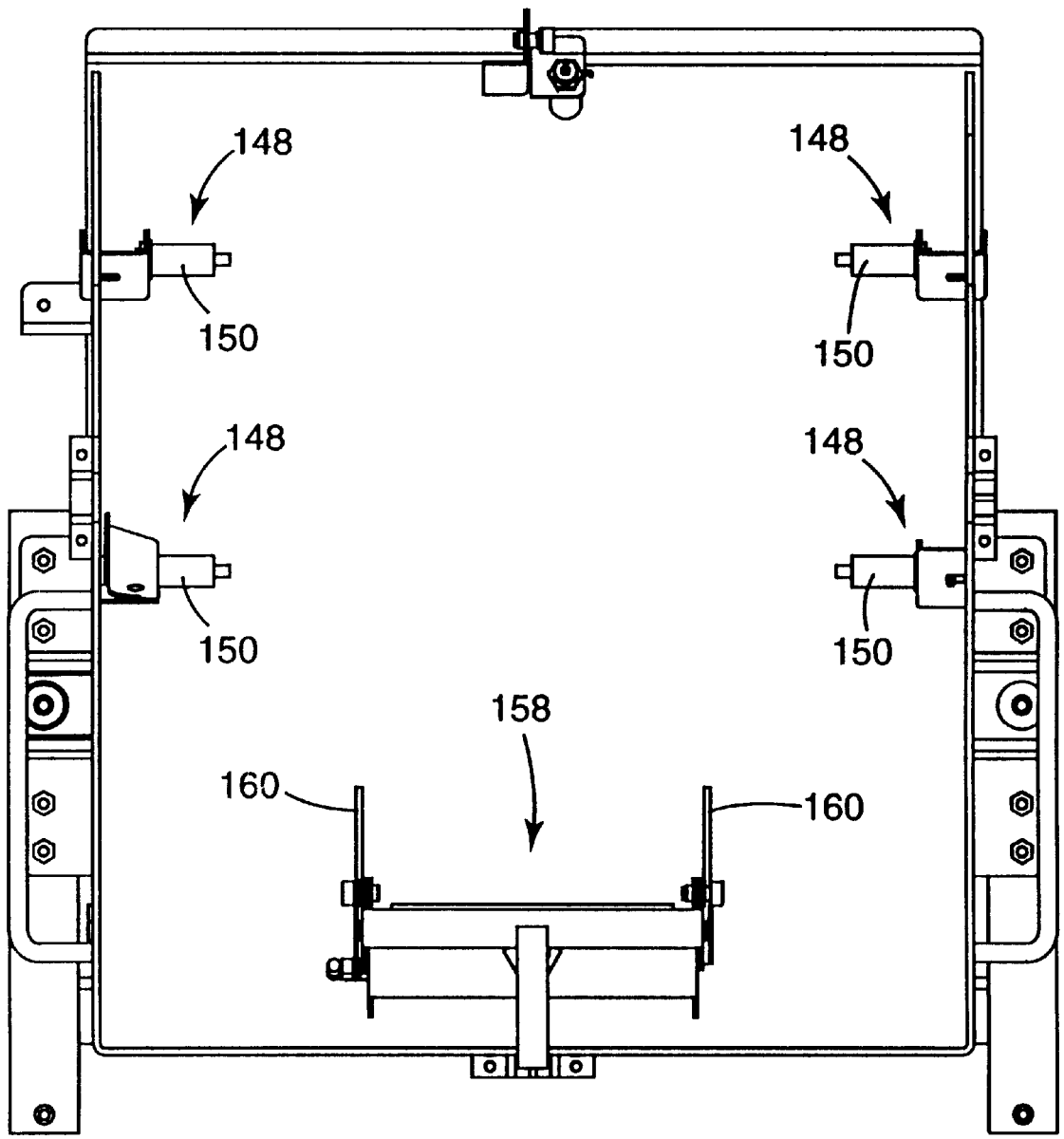
FIG. 14 is a bottom view of a portion of the optical scanning module shown in FIG. 12.
Figure 15:
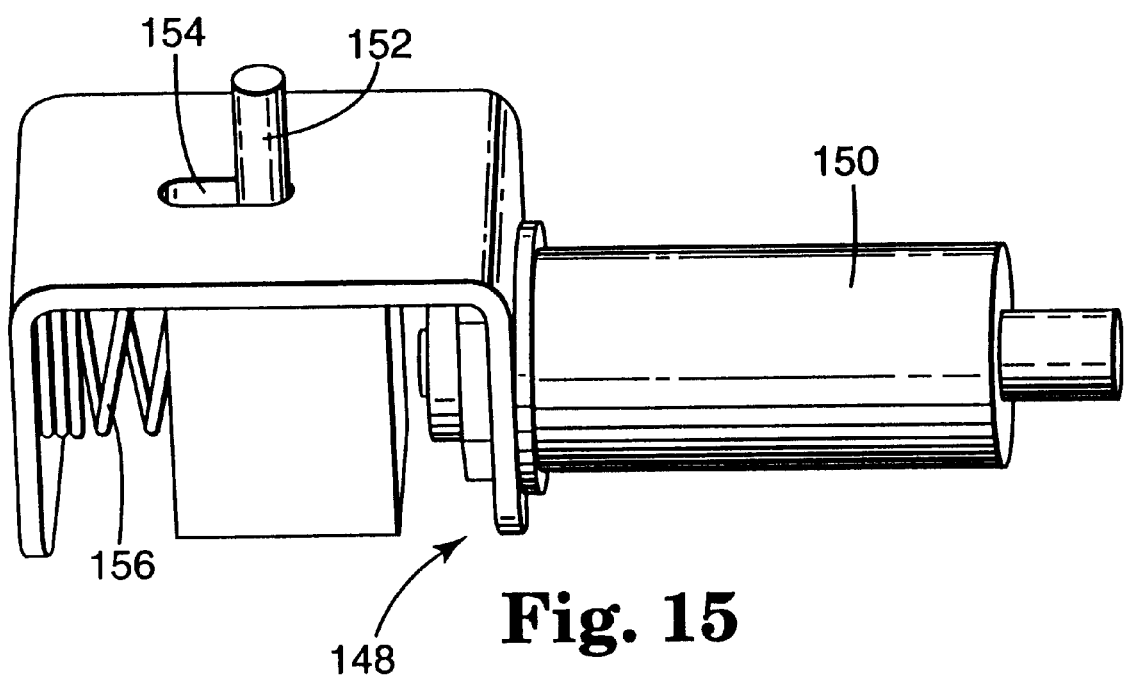
FIG. 15 is a perspective view of a film alignment device for use within the optical scanning module shown in FIG. 12.

Film alignment devices 148, shown in FIGS. 14 and 15, includes push solenoid 150 connected to pin 152 may be used to assist in proper alignment of photothermographic element 12 on film platen 144. Film alignment devices 148 are mounted on the underside of film platen 144 allowing pins 152 to protrude through slots 154. A set of four film alignment devices 148 are used to perform the alignment and centering of photothermographic element 12. As photothermographic element 12 is transported onto film platen 144, solenoids 150 are engaged allowing pins 152 to be compressed against springs 156 resulting in the movement of pins 152 away from the center of film platen 144 and thus clearing the path for the transport of photothermographic element 12 onto film platen 144. After photothermographic element 12 is transported upon the surface of film platen 144, solenoids 150 are disengaged allowing pins 152 to move toward the edges of photothermographic element 12 by action of springs 156. Photothermographic element 12 is then centered due to the balance of the spring forces.

Optical frame 140 is lighter and more compact than conventional machined fixtures used in most laser imaging systems. By integrating 2-D laser scanner 112 with film platen 144, optical scanning module 108 can be vibrationally isolated from the rest of apparatus 100 and kept compact in size. Another advantage of having laser scanner 112 integrated with film platen 144 is that any vibration within optical scanning module 108 will be in phase thus reducing image artifacts. This vibrational isolation allows parallel operations within apparatus 100 without effecting the final image quality of the imaged photothermographic element 12.

Once the scanning of the image is complete then exposed photothermographic element 12 is transported out of film platen 144 by use of film ejection mechanism 158 comprising spring-biased, hinged lever arm pair 160 which is coupled to solenoid plunger 162 through a hook and bar connection. The spring-biasing holds level arm pair 160 retracted from the edge of exposed photothermographic element 12 until ready for transportation of exposed photothermographic element 12 out of film platen 144. When solenoid 162 is actuated, it pivots lever arm pair 160 against the edge of exposed photothermographic element 12 and moves exposed photothermographic element 12 out of the plane of film platen 144 toward bidirectional film staging mechanism 132 for transportation of exposed photothermographic element 12 to thermal processor 10. Film ejection mechanism 158 works particularly well with photothermographic elements 12 having a thickness greater than 5 mils (0.18 millimeters). Bi-directional film staging mechanism 132, shown in FIG. 11, comprises a set of three rollers 138, 134, and 136 where center roller 134 is driven and rollers 138, 136 are idlers. Film staging mechanism 132 is designed such that exposed photothermographic element 12 can be transported out of film platen 144 between rollers 134 and 136 while simultaneously transporting unexposed photothermographic element 12 onto film platen 144 between rollers 134 and 138, if desired. chosen such that marring and static electricity introduced on the surfaces of photothermographic element 12 while being transported through the film staging mechanism 132 are kept to a minimum.

Electronics module 110 includes three interactive control systems; the image management control system, the laser optics control system and the machine control system. The operator can interface with the electronics through either a keypad mounted on the console, a portable keypad or a modem.

The laser optics control system includes a closed loop circuit which controls the intensity of laser diode 114 in laser scanner 112 which is described in U.S. Pat. No. 5,123,024. The laser optics control system also receives information through the machine control system from densitometer 164 mounted at the output of thermal processor 10. Densitometer 164 reads and compares optical density information from an optical density patch generated during the scanning process having a predetermined target optical density on the trailing edge of developed photothermographic element 12. If necessary the laser output is adjusted to compensate for any minor differences in optical density. If the differences are too large then the machine automatically recalibrates itself.

Processor conditions are controllable by the machine control electronics which receive information read from the bar code on the film cartridge and may be controllable by other systems interfaced with the system controller within the machine control system, e.g., densitometer 164.

Enclosure 101 of apparatus 100 is divided into two primary chambers, upper chamber 102 and lower chamber 104, with a passage for transporting photothermographic element 12 between the two chambers. Thermal processor 10 is preferably located in upper chamber 102. Lower chamber 104 containing optical scanning module 108, electronics module 110, and power supply 111 is kept at a positive pressure with respect to upper chamber 102 to prevent damage of the optics due to volatile materials outgassed from photothermographic elements 12 during the thermal processing of photothermographic elements 12 and to protect optical scanning module 108 from detrimental temperature increases. Lower chamber 104 is equipped with an air intake and upper chamber 102 is equipped with an exhaust to facilitate air flow from lower chamber 104 to upper chamber 102. Lower chamber 104 may be additionally divided into sub-chambers to isolate the optical scanning module 108 from electronics module 110 to further protect optical scanning module 108 from detrimental temperature increases. Apparatus 100 may be equipped with an internal or external filtering system to reduce odors generated during the thermal processing of photothermographic element 12 from outgassing of volatile materials within photothermographic element 12. In addition to the positive pressure in lower chamber 104, the filtering system assists in reducing the deposition of materials on components within apparatus 100. Although convenient for the preferred embodiment of apparatus 100 illustrated in FIG. 11, the chambers could be positioned in alternative orientations such as side by side.

Enclosure 101 can include an openable cover 166. For example, openable cover 166 can be pivotally connected to the remainder of enclosure 101. Guiding members 16 can be attached to cover 166 so that when cover 166 is opened, guiding members 16 are lifted away from heated member 14 providing easier access to heated member 14. This access allows for easier cleaning of heated member 14 and guiding members 16 and assists in clearing any jams that may occur during the transportation of photothermographic element 12 through thermal processor 10.

Guiding members 16 can, instead, be independently moveable from heated member 14 and cover 166. With this ability, guiding members 16 can move from a closed position against heated member 14 to an open position for cleaning heated member 14.

The integration of optical scanning module 108 and thermal processor 10 into a single unit provides several advantages. The footprint of apparatus 100 can be minimized to a size less than 80 centimeters×90 centimeters. The image quality and performance characteristics of the final imaged photothermographic element 12 can be controlled and adjusted automatically. The automated control also maximizes productivity of the imaging process. Photothermographic element 12 can be imaged while thermally processing a second photothermographic element 12 to increase productivity. A typical throughput of imaged photothermographic elements 12 is 120 14 inches×17 inches (35.5 centimeters×43.1 centimeters) sheets per hour when photothermographic elements 12, such as those described in example 1, are used. The throughput rate may vary depending on the sensitometric characteristics and size of photothermographic element 12.

For graphics arts imaging applications the system performance of photothermographic elements 12, the imaging device and thermal processor 10 must also be balanced in such a way to achieve an optimum image quality. Unlike medical diagnostic imaging films, graphic arts films depend on halftone dots to simulate tonal curves instead of continuous tone imaging. The image quality targets are therefore slightly different for the graphic arts applications. The image uniformity is preferably less than or equal to 0.15 change in optical density within a 12 inches×18 inches (30.5 centimeters×45.7 centimeters) image area at a specific optical density (typically at maximum optical density). The resolution is preferably 1200 to 3300 dots per inch (2.54 centimeters). The Ultraviolet minimum density ($D_{Min}$) is preferably less than or equal to 0.5 optical density units and the maximum density ($D_{Max}$) is preferably greater than or equal to 2.6 optical density units and more preferably greater than or equal to 3.2 optical density units. The dot gain of a 50% halftone dot is preferably less than 15% (before correction by a look up table) for a 133 line screen ruling and 2400 dots per 2.54 centimeters at a $D_{Max}$ greater than 2.6. In addition unexposed and final imaged photothermographic elements 12 have a dynamic curl (ANSI standard test PH1.29-1985) of less than 0.8 inch (20 millimeters) and preferably less than 0.4 inch (10 millimeters) and more preferably less than 0.2 inch (5 millimeters), and no visible scratches or wrinkles.

An imagesetter is typically used as the imaging device for imaging photothermographic elements 12 in graphic arts applications. An example of an imagesetter which uses a laser diode for the radiation source is Ultre*Setter, available from Ultre*Corporation, Port Washington, N.Y. The Ultre*Setter apparatus is described in the reference (W. Hansen, "A low cost, High quality laser recorder for personal typesetting", Hard Copy Output, Leo Beiser, Editor, Proc. SPIE Vol. 1079, pp 36–42 (1989)). The image is raster scanned with a laser but instead of modulating the laser beam to give exposure of varying energy to achieve continuous tone images, an imagesetter exposes to the same energy and modulates the laser beam on or off at the energy level where maximum density is achieved. The shorter time the beam is on the smaller the line segment and the longer the beam is on the longer the line segment. By building up the line segments with a degree of overlap to avoid visible scan lines, dots of various sizes can be created to simulate grey levels when printed.

There are typically three types of imagesetters used in graphic arts applications; external drum, internal drum and capstan. The external drum and internal drum typically use precut film sheets whereas the capstan typically uses roll film. An embodiment of the present invention which is capable of producing high quality images which meet the graphic arts image quality targets includes photothermographic element 12 as described in example 1 (except a 4 mil (0.10 millimeters) base is used instead of a 7 mil (0.18 millimeters) base), an imagesetter such as the Ultre*Setter described above and thermal processor 10 described and illustrated in FIG. 1. The imagesetter and thermal processor 10 could be separate units or integrated into a single device.

Another aspect of the present invention is a process for converting digital data to a visible image by imaging and developing a photothermographic element 12. Photothermographic element 12 is exposed to modulated radiation to create a latent image within photothermographic element 12 representative of the digital data. The latent image stored within the exposed photothermographic element 12 is rendered visible by contacting photothermographic element 12 with a heated member 14 in thermal processor 10 for sufficient dwell time at or above a threshold development temperature.

Preferred photothermographic elements 12 used in the present invention include silver halide-containing photothermographic imaging elements (i.e., heat-developable photographic elements) also known as "dry silver" compositions or emulsions. Photothermographic elements are well known and generally comprise a support having coated thereon: (1) a photosensitive material that generates elemental silver when irradiated; (2) a non-photosensitive, reducible silver source; (3) a reducing agent for the non-photosensitive reducible silver source; and (4) a binder. The photosensitive material is generally photographic silver halide which must be in catalytic proximity to the non-photosensitive, reducible silver source. Catalytic proximity requires an intimate physical association of these two materials so that when silver specks or nuclei are generated by the irradiation or light exposure of the photographic silver halide, those nuclei are able to catalyze the reduction of the reducible silver source. It has long been understood that elemental silver (Ag$^*$) is a catalyst for the reduction of silver ions, and the photosensitive photographic silver halide may be placed into catalytic proximity with the non-photosensitive, reducible silver source in a number of different fashions, such as by partial metathesis of the reducible silver source with a halogen-containing source (see, for example, U.S. Pat. No. 3,457,075); by coprecipitation of silver halide and reducible silver source material (see, for example, U.S. Pat. No. 3,839,049); and other methods that intimately associate the photosensitive photographic silver halide and the non-photosensitive, reducible silver source.

In both photographic and photothermographic emulsions, exposure of the photographic silver halide to light produces small clusters of silver atoms (Ag$^*$). The imagewise distribution of these clusters is known in the art as a latent image. This latent image generally is not visible by ordinary means and the photosensitive emulsion must be further processed in order to produce a visible image. The visible image is produced by the reduction of silver ions, which are in catalytic proximity to silver halide grains bearing the clusters of silver atoms, i.e. the latent image. This produces a black-and-white image.

As the visible image is produced entirely by elemental silver (Ag$^*$), one cannot readily decrease the amount of silver in the emulsion without reducing the maximum image density. However, reduction of the amount of silver is often desirable in order to reduce the cost of raw materials used in the emulsion.

One method of increasing the maximum image density in black-and-white photographic and photothermographic emulsions without increasing the amount of silver in the emulsion layer is by incorporating toning agents into the emulsion. Toning agents improve the color of the silver image of the photothermographic emulsions.

Another method of increasing the maximum image density of photographic and photothermographic emulsions without increasing the amount of silver in the emulsion layer is by incorporating dye-forming materials in the emulsion and producing color images. For example, color images can be formed by incorporation of leuco dyes into the emulsion. A leuco dye is the reduced form of a color-bearing dye. It is generally colorless or very lightly colored. Upon imaging, the leuco dye is oxidized, and the color-bearing dye and a reduced silver image are simultaneously formed in the exposed region. In this way a dye enhanced silver image can be produced as shown, for example in U.S. Pat. Nos. 4,187,108; 4,374,921; and 4,460,681.

Multicolor photothermographic imaging articles typically comprise two or more monocolor-forming emulsion layers (often each emulsion layer comprises a set of bilayers containing the color-forming reactants) maintained distinct from each other by barrier layers. The barrier layer overlaying one photosensitive, photothermographic emulsion layer typically is insoluble in the solvent of the next photosensitive, photothermographic emulsion layer. Photothermographic articles having at least 2 or 3 distinct color-forming emulsion layers are disclosed in U.S. Pat. Nos. 4,021,240 and 4,460,681. Various methods to produce dye images and multicolor images with photographic color couplers and leuco dyes are well known in the art as represented by U.S. Pat. Nos. 4,022,617; 3,531,286; 3,180,731; 3,761, 270; 4,460,681; 4,883,747; and *Research Disclosure*, March 1989, item 29963.

With the increased availability of low-irradiance light sources such as light emitting diodes (LED), cathode ray tubes (CRT), and semi-conductor laser diodes, have come efforts to produce high-speed, photothermographic elements which require shorter exposure times. Such photothermographic systems find use in, for example, conventional black-and-white or color photothermography, in electronically-generated black-and-white or color hardcopy recording, in graphic arts laser recording, for medical diagnostic laser imaging, in digital color proofing, and in other applications.

Various techniques are typically employed to try and gain higher sensitivity in a photothermographic material. These techniques center around making the silver halide crystals' latent image centers more efficient such as by introducing imperfections into the crystal lattice or by chemical sensitization of the silver halide grains and by improving the sensitivity to particular wavelengths of light by formulating new improved sensitizing dyes or by the use of supersensitizers.

In efforts to make more sensitive photothermographic materials, one of the most difficult parameters to maintain at a very low level is the various types of fog or $D_{Min}$. Fog is spurious image density which appears in non-imaged areas of the photothermographic element after development and is often reported in sensitometric results as $D_{Min}$. Photothermographic emulsions, in a manner similar to photographic emulsions and other light-sensitive systems, tend to suffer from fog.

Traditionally, photothermographic materials have suffered from fog upon coating. The fog level of freshly prepared photothermographic elements will be referred to herein as initial fog or initial $D_{Min}$.

In addition, the fog level of photothermographic elements often rises as the material is stored, or "ages." This type of fog will be referred to herein as shelf-aging fog. Adding to the difficulty of fog control on shelf-aging is the fact that the developer is incorporated in the photothermographic element. This is not the case in most silver halide photographic systems. A great amount of work has been done to improve the shelf-life characteristics of photothermographic materials.

A third type of fog in photothermographic systems results from the instability of the image after processing. The photoactive silver halide still present in the developed image may continue to catalyze formation of metallic silver (known as "silver print-out") during room light handling or post-processing exposure such as in graphic arts contact frames. Thus, there is a need for post-processing stabilization of photothermographic materials.

Without having acceptable resistance to fog, a commercially useful material is difficult to prepare. Various techniques have been employed to improve sensitivity and maintain resistance to fog.

U.S. Pat. No. 3,839,049 discloses a method of associating pre-formed silver halide grains with an organic silver salt dispersion. U.S. Pat. No. 4,161,408 (Winslow et al.) discloses a method of associating a silver halide emulsion with a silver soap by forming the silver soap in the presence of the silver halide emulsion. The process of U.S. Pat. No. 4,161,408 comprises adding silver halide grains with agitation to a dispersion of a long-chain fatty acid in water, with no alkali or metal salt of said fatty acid present while the acid is maintained above its melting point, then converting the acid to its ammonium or alkali metal salt, cooling the dispersion, and then converting the ammonium or alkali metal salt to a silver salt of the acid.

U.S. Pat. No. 4,212,937 describes the use of a nitrogen-containing organic base in combination with a halogen molecule or an organic haloamide to improve storage stability and sensitivity.

U.S. Pat. No. 4,152,160 describes the use of carboxylic acids, such as benzoic acids and phthalic acids, in photothermographic elements. These acids are used as antifoggants.

U.S. Pat. No. 3,589,903 describes the use of small amounts of mercuric ion in photothermographic silver halide emulsions to improve speed and aging stability.

U.S. Pat. No. 4,784,939 describes the use of benzoic acid compounds of a defined formula to reduce fog and to improve the storage stability of silver halide photothermographic emulsions. The addition of halogen molecules to the emulsions are also described as improving fog and stability.

U.S. Pat. No. 5,028,523 discloses radiation-sensitive, thermally-developable imaging elements comprising; a photosensitive silver halide; a light-insensitive silver salt oxidizing agent; a reducing agent for silver ion; and an antifoggant or speed enhancing compound comprising hydrobromic acid salts of nitrogen-containing heterocyclic compounds which are further associated with a pair of bromine atoms. These antifoggants are reported to be effective in reducing spurious background image density.

It is well known in the photographic art that when there is an intense level of radiation fluence used during the exposure (such as with flash exposure or such as with a laser scanned exposure), a phenomenon occurs which is referred to in the art as high intensity reciprocity failure (HIRF). The high intensity exposure causes a reduction in the effective speed of the emulsion, it is believed, because the efficiency of the grain's ability to trap photons is reduced and/or there is a solarization effect where the silver halide grains are initially fogged (photoreduced to form metallic silver) by the radiation and then photooxidized by the additional amount of radiation above that needed to form a latent image. This effect has reduced the ability of silver halide emulsions to be used with high power imaging devices.

The addition of certain dopants can aid in the reduction of high intensity reciprocity failure. Amongst the more preferred materials to reduce high intensity reciprocity failure is iridium doping of the silver halide grain either alone or in combination with other dopants such as ruthenium or rhodium.

The photothermographic elements may be constructed of one or more layers on a substrate. Single layer constructions must contain the silver source material, the silver halide, the developer and binder as well as optional additional materials such as toners, coating aids, and other adjuvants. Two-layer constructions must contain the silver source and silver halide in one emulsion layer (usually the layer adjacent to the substrate) and some of the other ingredients in the second layer or both layers, although two layer constructions comprising a single emulsion layer containing all the ingredients and a protective topcoat are envisioned. Multicolor photothermographic constructions may contain sets of these bilayers for each color, or they may contain all ingredients within a single layer as described in U.S. Pat. No. 4,708,928. In the case of multilayer multicolor photothermographic articles the various emulsion layers are generally maintained distinct from each other by the use of functional or non-functional barrier layers between the various photosensitive layers as described in U.S. Pat. No. 4,460,681.

While not necessary, it may be advantageous to add mercury (II) salts to the emulsion layer(s) as an antifoggant. Preferred mercury (II) salts for this purpose are mercuric acetate and mercuric bromide.

The light sensitive silver halide used in the photothermographic element may typically be employed in a range of 0.75 to 25 mol percent and, preferably, from 2 to 20 mol percent of organic silver salt.

The silver halide may be any photosensitive silver halide such as silver bromide, silver iodide, silver chloride, silver bromoiodide, silver chlorobromoiodide, silver chlorobromide, etc. The silver halide may be in any form which is photosensitive including, but not limited to cubic, orthorhombic, tabular, tetrahedral, etc., and may have epitaxial growth of crystals thereon.

The silver halide used in the photothermographic element may be employed without modification. However, it may be chemically sensitized with a chemical sensitizing agent such as a compound containing sulfur, selenium or tellurium etc., or a compound containing gold, platinum, palladium, rhodium or iridium, etc., a reducing agent such as a tin halide, etc., or a combination thereof. The details of these procedures are described in T. H. James "The Theory of the Photographic Process", Fourth Edition, Chapter 5, pages 149 to 169.

The silver halide may be added to the emulsion layer in any fashion which places it in catalytic proximity to the silver source. Silver halide and the organic silver salt which are separately formed or "preformed" in a binder can be mixed prior to use to prepare a coating solution, but it is also effective to blend both of them in a ball mill or homogenizer for a long period of time. Further, it is effective to use a process which comprises adding a halogen-containing compound in the organic silver salt prepared to partially convert the silver of the organic silver salt to silver halide.

Methods of preparing these silver halide and organic silver salts and manners of blending them are known in the art and described in *Research Disclosure*, June 1978, item 17029, and U.S. Pat. No. 3,700,458.

The use of preformed silver halide emulsions in the photothermographic element can be unwashed or washed to remove soluble salts. In the latter case the soluble salts can be removed by chill-setting and leaching or the emulsion can be coagulation washed, e.g., by the procedures described in U.S. Pat. Nos. 2,618,556; 2,614,928; 2,565,418; 3,241,969; and 2,489,341. The silver halide grains may have any crystalline habit including, but not limited to cubic, tetrahedral, orthorhombic, tabular, laminar, platelet, etc.

The organic silver salt may be any organic material which contains a reducible source of silver ions. Silver salts of organic acids, particularly long chain (10 to 30 preferably 15 to 28 carbon atoms) fatty carboxylic acids are preferred. Complexes of organic or inorganic silver salts wherein the ligand has a gross stability constant between 4.0 and 10.0 are also desirable. The silver source material should preferably constitute from about 5 to 30 percent by weight of the imaging layer.

The organic silver salt which can be used in the photothermographic element is a silver salt which is comparatively stable to light, but forms a silver image when heated to 80° C. or higher in the presence of an exposed photocatalyst (such as photographic silver halide) and a reducing agent.

Preferred organic silver salts include silver salts of organic compounds having a carboxy group. Non-limiting examples thereof include silver salts of an aliphatic carboxylic acid and a silver salt of an aromatic carboxylic acid. Preferred examples of the silver salts of aliphatic carboxylic acids include silver behenate, silver stearate, silver oleate, silver laurate, silver caproate, silver myristate, silver palmitate, silver maleate, silver fumarate, silver tartrate, silver linoleate, silver butyrate and silver camphorate, mixtures thereof, etc. Silver salts with a halogen atom or a hydroxyl on the aliphatic carboxylic acid can also be effectively used. Preferred examples of the silver salts of aromatic carboxylic acids and other carboxyl group-containing compounds include silver benzoate, a silver substituted benzoate such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenyl benzoate, etc., silver gallate, silver tannate, silver phthalate, silver terephthalate, silver salicylate, silver phenylacetate, silver pyromellitate, a silver salt of 3-carboxymethyl-4-methyl-4-thiazoline-2-thione or the like as described in U.S. Pat. No. 3,785,830, and silver salt of an aliphatic carboxylic acid containing a thioether group as described in U.S. Pat. No. 3,330,663, etc.

Silver salts of compounds containing mercapto or thione groups and derivatives thereof can also be used. Preferred examples of these compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-(ethylglycolamido) benzothiazole, a silver salt of thioglycolic acid such as a silver salt of an S-alkyl thioglycolic acid (wherein the alkyl group has from 12 to 22 carbon atoms), a silver salt of a dithiocarboxylic acid such as a silver salt of dithioacetic acid, a silver salt of a thioamide, a silver salt of 5-carboxylic-1-methyl-2-phenyl-4-thiopyridine, a silver salt of mercaptotriazine, a silver salt of 2-mercaptobenzoxazole, a silver salt as described in U.S. Pat. No. 4,123,274, for example, a silver salt of 1,2,4-mercaptotriazole derivative such as a silver salt of 3-amino-5-benzylthio-1,2,4-triazole, a silver salt of a thione compound such as a silver salt of 3-(2-carboxyethyl)-4-methyl-4-thiazoline-2-thione as disclosed in U.S. Pat. No. 3,301,678.

Furthermore, a silver salt of a compound containing an imino group may be used. Preferred examples of these compounds include silver salts of benzotriazole and derivatives thereof, for example, silver salts of benzotriazoles such as silver methylbenzotriazolate, etc., silver salt of halogen-substituted benzotriazoles, such as silver 5-chlorobenzotriazolate, etc., silver salts of carboimidobenzotriazole, etc., silver salt of 1,2,4-triazoles or 1-H-tetrazoles as described in U.S. Pat. No. 4,220,709, silver salts of imidazoles and imidazole derivatives, and the like. Various silver acetylide compounds can also be used, for instance, as described in U.S. Pat. Nos. 4,761,361 and 4,775,613.

It is also found convenient to use silver half soaps, of which an equimolar blend of silver behenate and behenic acid, prepared by precipitation from aqueous solution of the sodium salt of commercial behenic acid and analyzing about 14.5 percent silver, represents a preferred example. Transparent sheet materials made on transparent film backing require a transparent coating and for this purpose the silver behenate full soap, containing not more than about four or five percent of free behenic acid and analyzing about 25.2 percent silver may be used.

The method used for making silver soap dispersions is well known in the art and is disclosed in *Research Disclosure*, April 1983, item 22812, *Research Disclosure*, October 1983, item 23419 and U.S. Pat. No. 3,985,565.

The light-sensitive silver halides may be advantageously spectrally sensitized with various known dyes including cyanine, merocyanine, styryl, hemicyanine, oxonol, hemioxonol and xanthene dyes. Useful cyanine dyes include those having a basic nucleus, such as a thiazoline nucleus, an oxazoline nucleus, a pyrroline nucleus, a pyridine nucleus, an oxazole nucleus, a thiazole nucleus, a selenazole nucleus and an imidazole nucleus. Useful merocyanine dyes which are preferred include those having not only the above described basic nuclei but also acid nuclei, such as a thiohydantoin nucleus, a rhodanine nucleus, an oxazolidinedione nucleus, a thiazolidinedione nucleus, a barbituric acid nucleus, a thiazolinone nucleus, a malononitrile nucleus and a pyrazolone nucleus. In the above described cyanine and merocyanine dyes, those having imino groups or carboxyl groups are particularly effective. Practically, the sensitizing dyes to be used in the present invention may be properly selected from known dyes such as those described in U.S. Pat. Nos. 3,761,279, 3,719,495, and 3,877,943, British Pat. Nos. 1,466,201, 1,469,117 and 1,422,057, and can be located in the vicinity of the photocatalyst according to known methods. Spectral sensitizing dyes may be typically used in amounts of about $10^{-4}$ mol to about 1 mol per 1 mol of silver halide.

The reducing agent for the organic silver salt may be any material, preferably organic material, that can reduce silver ion to metallic silver. Conventional photographic developers such as phenidone, hydroquinones, and catechol are useful but hindered phenol reducing agents are preferred. The reducing agent should be present as 1 to 10 percent by weight of the imaging layer. In multilayer constructions, if the reducing agent is added to a layer other than an emulsion layer, slightly higher proportions, of from about 2 to 15 percent tend to be more desirable.

A wide range of reducing agents have been disclosed in dry silver systems including amidoximes such as phenylamidoxime, 2-thienylamidoxime and p-phenoxyphenylamidoxime, azines (e.g., 4-hydroxy-3,5-dimethoxybenzaldehydeazine); a combination of aliphatic carboxylic acid aryl hydrazides and ascorbic acid, such as 2,2'-bis(hydroxymethyl)propionyl-β-phenylhydrazide in combination with ascorbic acid; a combination of polyhydroxybenzene and hydroxylamine, a reductone and/or a hydrazine (e.g., a combination of hydroquinone and bis(ethoxyethyl)hydroxylamine, piperidinohexose reductone or formyl-4-methylphenylhydrazine); hydroxamic acids such as phenylhydroxamic acid, p-hydroxyphenylhydroxamic acid, and β-alaninehydroxamic acid; a combination of azines and sulfonamidophenols, (e.g., phenothiazine and 2,6-dichloro-4-benzenesulfonamidophenol); α-cyanophenylacetic acid derivatives such as ethyl-α-cyano-2-methylphenylacetate, ethyl α-cyanophenylacetate; bis-β-naphthols as illustrated by 2,2'- dihydroxyl-1-binaphthyl, 6,6'-dibromo-2,2'-dihydroxy-1,1'-binaphthyl, and bis(2-hydroxy-1-naphthyl)methane; a combination of bis-β-naphthol and a 1,3-dihydroxybenzene derivative, (e.g., 2,4-dihydroxybenzophenone or 2,4-dihydroxyacetophenone); 5-pyrazolones such as 3-methyl-1-phenyl-5-pyrazolone; reductones as illustrated by dimethylaminohexose reductone, anhydrodihydroaminohexose reductone, and anhydrodihydropiperidonehexose reductone; sulfonamido-phenol reducing agents such as 2,6-dichloro-4-benzenesulfonamidophenol, and p-benzenesulfonamidophenol; 2-phenylindane-1,3-dione and the like; chromans such as 2,2-dimethyl-7-t-butyl-6-hydroxychroman; 1,4-dihydropyridines such as 2,6-dimethoxy-3,5-dicarboethoxy-1,4-dihydropyridine; bisphenols (e.g., bis(2-hydroxy-3-t-butyl-5-methylphenyl) methane, 2,2-bis(4-hydroxy-3-methylphenyl)propane, 4,4-ethylidene-bis(2-t-butyl-6-methylphenol), and 2,2-bis(3,5-dimethyl-4-hydroxyphenyl)propane); ascorbic acid derivatives (e.g., 1-ascorbyl palmitate, ascorbyl stearate); and unsaturated aldehydes and ketones, such as benzil and biacetyl; 3-pyrazolidones and certain indane-1,3-diones.

In addition to the aforementioned ingredients, it may be advantageous to include additives known as "toners" that improve the image. Toner materials may be present, for example, in amounts from 0.1 to 10 percent by weight of all silver bearing components. Toners are well known materials in the photothermographic art as shown in U.S. Pat. Nos. 3,080,254; 3,847,612 and 4,123,282.

Examples of toners include phthalimide and N-hydroxyphthalimide; cyclic imides such as succinimide, pyrazoline-5-ones, and a quinazolinone, 3-phenyl-2-pyrazoline-5-one, 1-phenylurazole, quinazoline, and 2,4-thiazolidinedione; naphthalimides (e.g., N-hydroxy-1,8-naphthalimide); cobalt complexes (e.g., cobaltic hexamine trifluoroacetate); mercaptans as illustrated by 3-mercapto-1,2,4-triazole, 2,4-dimercaptopyrimidine, 3-mercapto-4,5-diphenyl-1,2,4-triazole and 2,5-dimercapto-1,3,4-thiadiazole; N-(aminomethyl)aryldicarboximides, (e.g., (N,N-dimethylaminomethyl)phthalimide, and N,N-(dimethylaminomethyl)naphthalene-2,3-dicarboximide); and a combination of blocked pyrazoles, isothiuronium derivatives and certain photobleaching agents (e.g., a combination of N,N'-hexamethylene bis(1-carbamoyl-3,5-dimethylpyrazole), 1,8-(3,6-diazaoctane)bis(isothiuronium trifluoroacetate) and 2-(tribromomethylsulfonyl) benzothiazole); and merocyanine dyes such as 3-ethyl-5[(3-ethyl-2-benzothiazolinylidene)-1-methylethylidene]-2-thio-2,4-oxazolidinedione; phthalazinone and phthalazinone derivatives or metal salts or these derivatives such as 4-(1-naphthyl)phthalazinone, 6-chlorophthalazinone, 5,7-dimethoxyphthalazinone, and 2,3-dihydro-1,4-phthalazinedione; a combination of phthalazinone plus sulfinic acid derivatives (e.g., phthalic acid, 4-methylphthalic acid, 4-nitrophthalic acid, and tetrachlorophthalic anhydride); quinazolinediones, benzoxazine or naphthoxazine derivatives; rhodium complexes functioning not only as tone modifiers, but also as sources of halide ion for silver halide formation in situ, such as ammonium hexachlororhodate (III), rhodium bromide, rhodium nitrate and potassium hexachlororhodate (III); inorganic peroxides and persulfates (e.g., ammonium peroxydisulfate and hydrogen peroxide); benzoxazine-2,4-diones such as 1,3-benzoxazine-2,4-dione, 8-methyl-1,3-benzoxazine-2,4-dione, and 6-nitro-1,3-benzoxazine-2,4-dione; pyrimidines and asymmetric triazines (e.g., 2,4-dihydroxypyrimidine, 2-hydroxy-4-aminopyrimidine), azauracils, and tetrazapentalene derivatives (e.g, 3,6-dimercapto-1,4-diphenyl-1H, 4H-2,3a,5,6a-tetrazapentalene, and 1,4-di(ochlorophenyl)-3, 6-dimercapto-1H,4H-2,3a,5,6a-tetrazapentalene).

A number of methods are known in the art for obtaining color images with dry silver systems including: a combination of silver benzotriazole, well known magenta, yellow and cyan dye-forming couplers, aminophenol developing agents, a base release agent such as guanidinium trichloroacetate and silver bromide in poly(vinyl butyral) as described in U.S. Pat. Nos. 4,847,188 and 5,064,742; preformed dye release systems such as those described in U.S. Pat. No. 4,678,739; a combination of silver bromoiodide, sulfonamidophenol reducing agent, silver behenate, poly (vinyl butyral), an amine such as n-octadecylamine and 2-equivalent or 4-equivalent cyan, magenta or yellow dye-forming couplers; leuco dye bases which oxidize to form a dye image (e.g., Malachite Green, Crystal Violet and para-rosaniline); a combination of in situ silver halide, silver behenate, 3-methyl-1-phenylpyrazolone and N,N'-dimethyl-pphenylenediamine hydrochloride; incorporating phenolic leuco dye reducing agents such as 2(3,5-di-(t-butyl)-4-hydroxyphenyl)-4,5-diphenylimidazole, and bis(3,5-di-(t-butyl)-4-hydroxyphenyl)phenylmethane, incorporating azomethine dyes or azo dye reducing agents; silver dye bleach processes (for example, an element comprising silver behenate, behenic acid, poly(vinyl butyral), poly(vinyl-butyral)peptized silver bromoiodide emulsion, 2,6-dichloro-4-benzenesulfonamidophenol, 1,8-(3,6-diazaoctane)bis (isothiuronium-p-toluenesulfonate) and an azo dye can be exposed and heat processed to obtain a negative silver image with a uniform distribution of dye, and then laminated to an acid activator sheet comprising polyacrylic acid, thiourea and p-toluenesulfonic acid and heated to obtain well defined positive dye images); and amines such as aminoacetanilide (yellow dye-forming), 3,3'-dimethoxybenzidine (blue dye-forming) or sulfanilide (magenta dye forming) that react with the oxidized form of incorporated reducing agents such as 2,6-dichloro-4-benzenesulfonamidophenol to form dye images. Neutral dye images can be obtained by the addition of amines such as behenylamine and p-anisidine.

Leuco dye oxidation in such silver halide systems for color formation is disclosed in U.S. Pat. Nos. 4,021,240, 4,374,821, 4,460,681 and 4,883,747.

Emulsions in the photothermographic element can contain plasticizers and lubricants such as polyalcohols (e.g., glycerin and diols of the type described in U.S. Pat. No. 2,960,404); fatty acids or esters such as those described in U.S. Pat. No. 2,588,765 and U.S. Pat. No. 3,121,060; and silicone resins such as those described in British Pat. No. 955,061.

The emulsions in the photothermographic element may contain additional stabilizers and antifoggants known in the photothermographic art. These may be primary stabilizers and antifoggants or post-processing stabilizers. Amongst the preferred antifoggants are organic compounds having trihalogented and especially tribromomethyl groups. These are often aryl(aromatic) nuclei having the halogenated group either directly attached to the aromatic nucleus or attached through a bridging group (e.g., sulfonyl). Other useful antifoggants include isocyanates, vinyl sulfones, and beta-halogenated sulfones.

The photothermographic elements may include image dye stabilizers. Such image dye stabilizers are illustrated by British Pat. No. 1,326,889; U.S. Pat. Nos. 3,432,300; 3,698,909; 3,574,627; 3,573,050; 3,764,337 and 4,042,394.

Photothermographic elements containing emulsion layers can be used in photographic elements which contain light absorbing materials and filter dyes such as those described in U.S. Pat. Nos. 3,253,921; 2,274,782; 2,527,583 and 2,956,879. If desired, the dyes can be mordanted, for example, as described in U.S. Pat. No. 3,282,699. Antihalation layers are particularly useful in scanned exposure elements. These layers are well known in the art and comprise a radiation absorbing material (matched to or including absorption of the imaging radiation) in a binder, usually below the emulsion layer, but sometimes above the emulsion layer, between the emulsion layer and the base, or behind the base.

Photothermographic elements containing emulsion layers as described herein can contain matting agents such as starch, titanium dioxide, zinc oxide, silica, polymeric beads including beads of the type described in U.S. Pat. No. 2,992,101 and U.S. Pat. No. 2,701,245.

Emulsions can be used in photothermographic elements which contain antistatic or conducting layers, such as layers that comprise soluble salts (e.g., chlorides, nitrates, etc.), evaporated metal layers, ionic polymers such as those described in U.S. Pat. Nos. 2,861,056 and 3,206,312 or insoluble inorganic salts such as those described in U.S. Pat. No. 3,428,451.

The binder may be selected from any of the well-known natural or synthetic resins such as gelatin, polyvinyl acetals, polyvinyl chloride, polyvinyl acetate, cellulose acetate, polyolefins, polyesters, polystyrene, polyacrylonitrile, polycarbonates, and the like. Copolymers and terpolymers are of course included in these definitions. The preferred photothermographic silver containing polymers are polyvinyl butyral, ethyl cellulose, methacrylate copolymers, maleic anhydride ester copolymers, polystyrene, and butadiene-styrene copolymers.

Optionally, these polymers may be used in combinations of two or more thereof. Such a polymer is used in an amount sufficient to carry the components dispersed therein, that is, within the effective range of the action as the binder. The effective range can be appropriately determined by one skilled in the art. As a guide in the case of carrying at least an organic silver salt, it can be said that a preferable ratio of the binder to the organic silver salt ranges from 15:1 to 1:2, and particularly from 8:1 to 1:1.

Photothermographic emulsions may be coated on a wide variety of supports. The support or substrate can be selected from a wide range of materials depending on the imaging requirement. Substrates may be colored, transparent, translucent or opaque. Typical supports include polyester film, subbed polyester film, polyethylene terephthalate film, cellulose nitrate film, cellulose ester film, polyvinyl acetal film, polycarbonate film and related or resinous materials, as well as glass, paper, metal and the like. Typically, a flexible support is employed, especially a paper support, which may be partially acetylated or coated with baryta and/or an α-olefin polymer, particularly a polymer of an α-olefin containing 2 to 10 carbon atoms such as polyethylene, polypropylene, ethylene-butene copolymers and the like. Preferred polymeric materials for the support include polymers having good heat stability, such as polyesters. A particularly preferred polyester is polyethylene terephthalate.

Photothermographic emulsions of this invention can be coated by various coating procedures including dip coating, air knife coating, curtain coating, or extrusion coating using hoppers of the type described in U.S. Pat. No. 2,681,294. If desired, two or more layers may be coated simultaneously by the procedures described in U.S. Pat. No. 2,761,791 and British Pat. No. 837,095.

Additional layers may be incorporated into photothermographic elements of the present invention such as dye receptive layers for receiving a mobile dye image, an opacifying layer when reflection prints are desired, an antihalation layer, a protective topcoat layer and a primer layer as is known in the photothermographic art. Additionally, it may be desirable in some instances to coat different emulsion layers on both sides of a transparent substrate, especially when it is desirable to isolate the imaging chemistries of the different emulsion layers. Using these types of media, optimized for the particular wavelengths of the imaging sources, the apparatus, system and process of the present invention may be practiced.

The following describes an example of a photothermographic element 12 that may be used in the present invention. The particular materials and amounts thereof recited in the following example, as well as other conditions and details, should not be construed to unduly limit this invention.

EXAMPLE 1

A silver halide-silver dry behenate soap was prepared by the procedure described in U.S. Pat. No. 3,839,049. The silver halide totalled 9 mole % of the total silver, while silver behenate comprised 91 mole % of the total silver. The silver halide was a 0.055 micron silver bromoiodide emulsion with 2% iodide.

A photothermographic emulsion was prepared by homogenizing 455 grams of the silver halide-silver behenate dry soap described above with 27 grams toluene, 1918 grams 2-butanone, and 48 grams polyvinylbutyral (B-79, Monsanto). The homogenized photothermographic emulsion (698 grams) and 60 grams of 2-butanone were cooled to 55° F. (12.8° C.) with stirring. Pyridinium hydrobromide perbromide (0.92 grams) was added and stirred for two hours. The addition of 3.25 ml of a calcium bromide solution (1 gram of $CaBr_2$ and 10 ml of methanol) was followed by thirty minutes stirring. Additional polyvinylbutyral (158 grams B-79) was added and stirred for twenty minutes. The temperature was raised to 70° F. (21.1° C.) and the following were added at 15 minute intervals with stirring:

3.42 grams 2-(tribromomethylsulfone)quinoline 28.1 grams 1,1-bis(2-hydroxy-3,5-dimethylphenyl)-3,5,5-trimethylhexane 41.1 grams of solution containing 0.545 grams 5-methylmercaptobenzimidazole 6.12 grams 2-(4-chlorobenzoyl)benzoic acid, 0.104 grams S-1 (sensitizing dye) and 34.3 grams methanol 2.14 grams isocyanate (Desmodur N3300, Mobay)

0.97 grams tetrachlorophthalic anhydride 2.88 grams phthlalazine

Dye S-1 has the structure

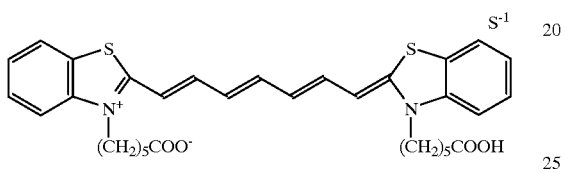

An active, protective topcoat solution was prepared with the following ingredients:

80.0 grams 2-butanone 10.7 grams methanol 8.0 grams cellulose acetate butyrate (CAB-171-155, Eastman Chemicals)

0.52 grams 4-methylphthalic acid 0.80 grams MRA-1, mottle reducing agent, a tertiary polymer of N-ethylperfluorooctane sulfonyl amidoethyl methacrylate/hydroxyethyl methacrylate/acrylic acid in a weight ratio of 70/20/10.

The photothermographic emulsion and topcoat were coated simultaneously on 7 mil (0.18 millimeters) blue polyester film base. A knife coater was set up with two simultaneous coating bars or knives separated by a six inch distance (15.2 centimeters). Both the silver trip layer and the top coat were multilayer coated by pouring the silver emulsion on the film prior to the rear knife and pouring the top coat on the film prior to the front bar. The film was then drawn forward so that both layers are coated simultaneously. This resulted in a single pass, multilayer coating method. The coated polyester base was dried at 175° F. (79.4° C.) for four minutes. The knives were adjusted to give dry coating weights of 23 grams per meter square for the silver layer and 2.4 grams per meter square for the top coat.

Although the present invention has been described with reference to preferred embodiments, those skilled in the art will recognize that variations and modifications may be made in form and detail without departing from the spirit and scope of the invention.

We claim:

1. A thermal processor, adapted to thermally develop an image in a photothermographic element, wherein said photothermographic element is transported at a transport rate, and wherein said thermal processor comprises:

a moving heated member positioned to receive said photothermographic element and to heat said photothermographic element to at least a threshold development temperature for a dwell time to develop an image in said photothernographic element; and a plurality of rotatable guiding members positioned at guiding positions adjacent said heated member for guiding said photothermographic element against said heated member for guiding said photothermographic element against said heated member by applying a total biasing force to said photothermographic element of not greater than 200 grams per centimeter of width of said photothermographic element, said plurality of guiding members causing said photothermographic element to be continuously held against said heated member when said photothermographic element is between said plurality of guiding members and contacted by said plurality of guiding members;

wherein said heated member is moveable and said guiding members are rotatable at rates which approximately match said transport rate of said photothermographic element; and wherein of said guiding members comprise a biasing means for providing a first biasing force, wherein the weight of said guiding member and the position of said guiding member relative to said heated member provide a second biasing force, said total biasing force includes said first biasing force and said second biasing force, and said biasing means being selectable to compensate for said second biasing force resulting from said position of said guiding member.

2. The thermal processor of claim 1, wherein said total biasing force ranges from 7 to 100 grams per centimeter of width of said photothermographic element.

3. The thermal processor of claim 1, wherein said total biasing force ranges from 7 to 50 grams per centimeter of width of said photothermographic element.

4. The thermal processor of claim 1, wherein said total biasing force ranges from 14 to 30 grams per centimeter of width of said photothermographic element.

5. The thermal processor of claim 1, wherein said guiding members comprise a plurality of rotatable rollers, said rotatable rollers being sufficiently spaced apart to allow the portion of said photothermographic element between said rotatable rollers to expand and contract.

6. The thermal processor of claim 5, wherein at least one of said rotatable rollers has a first end and a second end, and wherein each guiding member further comprises a first biasing means for biasing said first end of a corresponding roller toward said heated member, and a second biasing means for biasing said second end of a corresponding roller toward said heated member.

7. The thermal processor of claim 1, wherein said guiding members comprise a plurality of cylindrical, rotatable, low thermal mass rollers.

8. The thermal processor of claim 7, said rotatable rollers being hollow.

9. The thermal processor of claim 1, wherein said guiding members comprise a plurality of rotatable belts, said rotatable belts being spaced apart.

10. The thermal processor of claim 1, wherein said heated member is a rotatable cylinder.

11. The thermal processor of claim 1, further comprising a guide positioned adjacent to said heated member for guiding said photothermographic element from said heated member and for redirecting said photothermographic element away from said heated member at an angle between 10 to 50 degrees.

12. The thermal processor of claim 1, wherein said photothermographic element comprises a film base.

13. The thermal processor of claim 1, wherein said photothermographic element comprises a paper base.

14. The thermal processor of claim 1, wherein said photothermographic element comprises a sheet of photothermographic material.

15. The thermal processor of claim 1, wherein said photothermographic element comprises a roll of photothermographic material.

16. The thermal processor of claim 1, further comprising a heater for heating said heated member.

17. The thermal processor of claim 1, further comprising an enclosure within which said heated member and said guiding member are positioned.

18. The thermal processor of claim 1, further comprising a photothermographic element having an image which is developed by heat applied by the heated member.

19. The thermal processor of claim 1, wherein the guiding members are positioned and configured to prevent contact between the photothermographic element and a surface which is stationary relative to the photothermographic element when the photothermographic element is transported against the heated member.

20. A thermal processor, adapted to thermally develop an image in a photothermographic element at a throughput rate, wherein said thermal processor comprises:
- a moving heated member positioned to receive said photothermographic element to heat said photothermographic element to at least a threshold development temperature, said heated member includes a resilient layer having a thickness and thermal conductivity for contacting said photothermographic element said resilient layer being sufficiently thick so that a foreign particle can be depressed into said resilient layer to reduce an image defect in said image due to insufficient heat transfer causable by said foreign particle, and said resilient layer being sufficiently thin and sufficiently thermally conductive so that said resilient layer delivers to said photothermographic element sufficient heat to thermally develop said photothermographic element sufficient heat to thermally develop said photothermographic element at said throughput rate;
- means for guiding said photothermographic element against said moving heated member wherein said guiding means comprises a plurality of rotatable guiding rollers; and
- a heater thermally connected to said heated member for heating said heated member.

21. The thermal processor of claim 20, said foreign particle having a size of less than 0.050 inch.

22. The thermal processor of claim 20, wherein said throughput rate being at least 60 photothermographic elements per hour, and said photothermographic elements having an area of at least 150 square inches.

23. The thermal processor of claim 20, wherein said throughput rate being at least 120 photothermographic elements per hour, and said photothermographic elements having an area of at least 150 square inches.

24. The thermal processor of claim 20, said throughput rate being at least 200 photothermographic elements per hour, and said photothermographic elements having an area of at least 80 square inches.

25. The thermal processor of claim 20, said throughput rate being at least 9,000 square inches of said photothermographic element per hour.

26. The thermal processor of claim 20, said throughput rate being at least 18,000 square inches of said photothermographic element per hour.

27. The thermal processor of claim 20, said throughput rate being at least 45,000 square inches of said photothermographic element per hour.

28. The thermal processor of claim 20, wherein said throughput rate is at least 120 photothermographic elements per hour when each of said photothermographic elements has an area of approximately 150 square inches or more.

29. The thermal processor of claim 20, wherein said resilient layer comprises an elastomeric material doped with a thermally conductive material to increase said thermal conductivity of said resilient layer.

30. The thermal processor of claim 20, wherein said heated member includes a support member positioned beneath said resilient layer, said thickness of said resilient layer being at least 0.010 inch.

31. The thermal processor of claim 20, said thickness of said resilient layer being between 0.020 and 0.050 inch.

32. The thermal processor of claim 20, wherein said resilient surface on said heated member has a surface roughness of less than 250 microinches.

33. The thermal processor of claim 20, wherein said resilient surface on said heated member has a surface roughness of between 75–125 microinches.

34. The thermal processor of claim 20, said thermal conductivity of said resilient layer being at least 2 British thermal units-inches, per hour, per square foot, per degree Fahrenheit.

35. The thermal processor of claim 20, said thermal conductivity of said resilient layer being at least 4 British thermal units-inches, per hour, per square foot, per degree Fahrenheit.

36. The thermal processor of claim 20, further comprising the photothermographic element having an image which is developed by heat applied by the heated member.

37. A thermal processor, adapted to thermally develop an image in a photothermographic element at a throughput rate, wherein said photothermographic element is transported at a transport rate, and wherein said thermal processor comprises:
- a moving heated member positioned to receive said photothermographic element to heat said photothermographic element to at least a threshold development temperature, said heated member includes a resilient layer having a thickness and thermal conductivity for contacting said photothermographic element, said resilient layer being sufficiently thick so that a foreign particle can be depressed into said resilient layer to reduce an image defect in said image due to insufficient heat transfer causable by said foreign particle, and said resilient layer being sufficiently thin and sufficiently thermally conductive so that said resilient layer delivers to said photothermographic element sufficient heat to thermally develop said photothermographic element at said throughput rate;
- a heater thermally connected to said heated member for heating said heated member; and
- a plurality of rotatable guiding members positioned at guiding positions adjacent said heated member for guiding said photothermographic element against said heated member by applying a total biasing force to said photothermographic element of not greater than 200 grams per centimeter of width of said photothermographic element;
- wherein said heated member moves and said guiding members are rotatable at rates which approximately match said transport rate of said photothermographic element.

38. A thermal processor, adapted to thermally develop an image in a thermally developable element, wherein said thermal processor comprises:

a moving heated member positioned to receive said element to heat and develop said element, said heated member comprises a resilient layer having a thickness and thermal conductivity for contacting said element, said resilient layer being sufficiently thick so that a foreign particle can be depressed into said resilient layer to reduce an image defect in said image due to insufficient heat transfer causable by said foreign particle, and said resilient layer being sufficiently thin and sufficiently thermally conductive so that said resilient layer delivers to said element sufficient heat to thermally develop said element; and a plurality of rotatable guiding members positioned at guiding positions adjacent said heated member for biasing said element against said heated member.

39. The thermal processor of claim 38, further comprising the thermally developable element having an image which is developed by heat applied by the heated member.

40. A thermal processor, adapted to thermally develop an image in a thermally developable element, wherein said thermal processor comprises:

a moving heated member positioned to receive said element to heat and develop said element and having a polymeric, resilient, outer layer which contacts said thermally developable element;

a plurality of rotatable guiding members positioned at guiding positions adjacent said heated member for biasing said element against said heated member, said plurality of guiding members being mechanically connected; and means for allowing the plurality of mechanically connected guiding members to be lifted from the heated member to allow an operator more direct access to heated member.

41. The thermal processor of claim 40, the plurality of rotatable guiding members comprising at least six of said plurality of guiding members.

42. The thermal processor of claim 40, the allowing means comprising means for allowing the plurality of rotatable guiding members to be pivoted away from the heated member.

43. The thermal processor of claim 40, further comprising the thermally developable element having an image which is developed by heat applied by the heated member.

* * * * *